(12) United States Patent
Lahalih

(10) Patent No.: US 9,073,014 B1
(45) Date of Patent: Jul. 7, 2015

(54) NANOCOMPOSITE MIXED-MATRIX MEMBRANE

(71) Applicant: KUWAIT INSTITUTE FOR SCIENTIFIC RESEARCH, Safat (KW)

(72) Inventor: Shawqui M. Lahalih, Safat (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 14/504,379

(22) Filed: Oct. 1, 2014

(51) Int. Cl.
| | |
|---|---|
| *B01D 39/00* | (2006.01) |
| *B01D 39/14* | (2006.01) |
| *B01D 71/26* | (2006.01) |
| *B01D 67/00* | (2006.01) |
| *B01D 69/12* | (2006.01) |
| *B01D 69/02* | (2006.01) |
| *B01D 61/36* | (2006.01) |
| *C02F 1/04* | (2006.01) |
| *B29C 47/00* | (2006.01) |
| *C02F 103/08* | (2006.01) |
| *C02F 101/10* | (2006.01) |
| *B29K 23/00* | (2006.01) |

(52) U.S. Cl.
CPC ............ *B01D 71/26* (2013.01); *B01D 67/0079* (2013.01); *B01D 69/12* (2013.01); *B01D 69/02* (2013.01); *B01D 61/364* (2013.01); *B01D 61/366* (2013.01); *C02F 1/043* (2013.01); *B29C 47/0021* (2013.01); *B01D 2325/028* (2013.01); *C02F 2103/08* (2013.01); *C02F 2101/10* (2013.01); *B29K 2023/12* (2013.01)

(58) Field of Classification Search
CPC ... B01D 71/26; B01D 67/0027; B01D 69/148
USPC .......... 210/502.1, 500.36, 500.25; 264/288.4, 264/288.8, 289.3
See application file for complete search history.

(56) References Cited

U.S. PATENT DOCUMENTS

| | | | | |
|---|---|---|---|---|
| 5,435,955 | A * | 7/1995 | Kamei et al. ................... | 264/154 |
| 5,744,524 | A * | 4/1998 | Manandhar et al. ............ | 524/70 |
| 7,056,440 | B2 * | 6/2006 | Haney et al. ................... | 210/644 |
| 8,147,639 | B2 * | 4/2012 | Arrington ....................... | 156/247 |
| 8,217,108 | B2 | 7/2012 | Cooper et al. | |
| 8,795,565 | B2 * | 8/2014 | Wei et al. ..................... | 264/210.1 |
| 2006/0235127 | A1 * | 10/2006 | Moad et al. ..................... | 524/444 |

(Continued)

FOREIGN PATENT DOCUMENTS

| | | | |
|---|---|---|---|
| CA | 2450150 | * | 5/2004 |
| CN | 1746216 | | 3/2006 |

*Primary Examiner* — Ana Fortuna
(74) *Attorney, Agent, or Firm* — Richard C Litman

(57) ABSTRACT

The nanocomposite mixed-matrix membrane is a nanocomposite made from a nanofiller of Halloysite nanotubes or polypropylene-grafted maleic anhydride nano-layered silica dispersed or embedded in a hydrophobic polymer matrix. The Halloysite nanotubes are a 1:1 layered alumino-silicate clay having the chemical formula $Al_2O_3 \ Si_2O_4 \ 4(H_2O)$) formed into multi-layered hollow cylinders having walls that are formed from alternating layers of alumina and silica. The membrane is formed by extrusion of the nanocomposite with stretching over rollers during the extrusion, followed by annealing, cold stretching at room temperature, and hot stretching. The resulting membrane is microporous and can be used as a membrane distillation (MD) membrane for seawater and brackish water desalination.

3 Claims, 16 Drawing Sheets

(56) References Cited

U.S. PATENT DOCUMENTS

2008/0249228 A1* 10/2008 Warner et al. ................. 524/493
2010/0025330 A1    2/2010 Ratto et al.
2010/0313753 A1* 12/2010 Calis et al. ........................ 95/45
2011/0160345 A1*  6/2011 Cooper et al. ................ 523/466
2013/0295364 A1* 11/2013 Saavedra et al. .............. 428/220

* cited by examiner

NANOCOMPOSITE MIXED-MATRIX MEMBRANE

BACKGROUND OF THE INVENTION

1. Field of the Invention

The present invention relates to membranes used in distillation, e.g., for distillation, and particularly to nanocomposite mixed-matrix membrane made from a nanofiller, such as Halloysite nanotubes (HNT) or polypropylene-grafted maleic anhydride-nano-layered silica (Ma-Si), dispersed in a polymer matrix, such as polypropylene (PP).

2. Description of the Related Art

Despite great success and potential of the current membrane technology for water desalination, including great improvements in water quality and an increase in recovery factor of the desalination processes, there are several potential pitfalls. These problems include both bio-fouling and inorganic fouling, high energy consumption, huge costs, and high brine disposal that may lead to serious environmental impact. There are also other potential problems associated with high-pressure driven membranes (i.e., NF, UF, MF and RO) that include membrane compaction caused by the use of high pressure that leads to shorter service life; limitation of reverse osmosis (RO) membranes to low salinity of about 5% or less; low recovery factor of 40-60%; and others. In addition to these membrane-associated problems, there are other problems that include the $21^{st}$ century global challenges. These challenges include water stress, climate change, environmental issues, and energy crisis. This has prompted investigations for new and innovative solutions. The two major areas of research in this context have been directed towards the development of an effective membrane distillation (MD) membrane with improved vapor flux and improved mechanical, physical and morphological properties, and towards the use of integrated membrane systems, including MD membranes.

Although membrane distillation (MD) has been known for the past four decades, its use in water desalination has gained wide attention worldwide, and lots of intensive research has been carried out during the last ten years. Membrane Distillation is an emerging non-isothermal separation technique that uses a microporous hydrophobic membrane in contact with an aqueous heated solution on one side (feed or retentate), and a condensing phase (permeate or distillate) on the other side. It is thought that nanotechnology can be used with polymers in MD membranes to improve their properties.

Thus, a nanocomposite mixed-matrix membrane solving the aforementioned problems is desired.

SUMMARY OF THE INVENTION

The nanocomposite mixed-matrix membrane includes a nanofiller of Halloysite nanotubes (HNT) or polypropylene-grafted maleic anhydride nano-layered silicate dispersed or embedded in a polymer matrix. The polymer matrix is a hydrophobic polymer, preferably polypropylene. The Halloysite nanotube is a 1:1 layered alumino-silicate compound having a chemical formula $Al_2O_3\ Si_2O_4\ 4(H_2O)$). It is a clay forming a multi-layered hollow cylinder having walls that are formed from alternating layers of alumina and silica. The membrane is formed by an extrusion process, and is further treated intra-extrusion by stretching and post-extrusion by annealing and stretching to provide a microporous, strong, flexible material that can withstand the rigors of use in membrane distillation for desalination, as well as other uses where a selectively permeable, hydrophobic membrane is desired.

The method of preparing the nanocomposite mixed-matrix membrane includes (a) blending a hydrophobic polymer with different percentages of a nanomaterial selected from the group consisting of Halloysite nanotube, polypropylene-grafted maleic anhydride nano-layered silica, or combinations thereof to form different blends; (b) pelletizing the different blends of a hydrophobic polymer and different percentages of the nanomaterial using a pelletizer; (c) extruding the different pelletized blends of the hydrophobic polymer with the different percentages of the nanomaterial using a twin-screw extruder set at 200° C.-230° C. to give a melt extrusion temperature of about 175° C. to 190° C. and form an extruded film; d) stretching the extruded film while it is exiting from the extruder using a casting roller set at a temperature of 60° C.-80° C. and a downstream pick-up roller or haul-off roller. These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
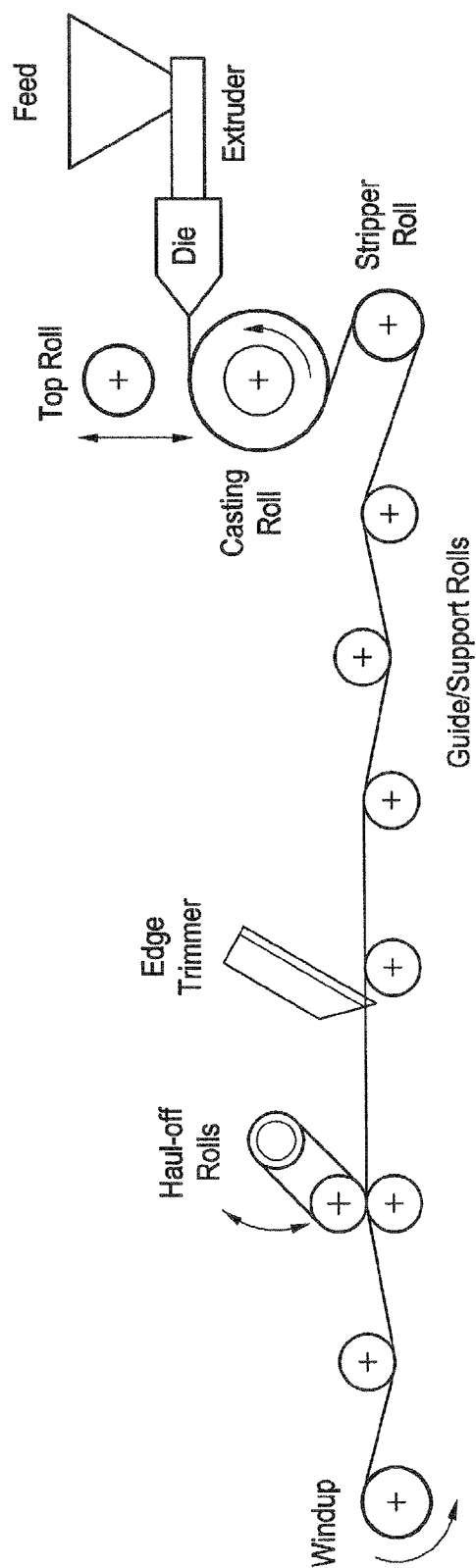
FIG. 1 is a schematic diagram of a twin screw extruder, casting roll unit, haul-off rolls and other downstream units used to make a nanocomposite mixed-matrix membrane according to the present invention.

As defined herein, "Halloysite" is a naturally occurring clay that is a 1:1 layered alumino-silicate of the chemical formula ($Al_2O_3$ $Si_2O_4$ $n(H_2O)$). Halloysite nanotubes (HNT) are composed of multi-layered hollow cylinders, and the walls are formed from alternating layers of alumina and silica. The alternating layers of alumina and silica demonstrate a packing disorder, causing them to curve and form hollow cylinders. The outer diameter of these cylinders ranges between 40 nm to 300 nm, the length ranges from 1000 nm to 5000 nm, and the inner diameter ranges from 16 nm to 50 nm. HNT and platy kaolinite are from the same group of kaolin, and HNT is normally more preferred because it can be processed with polypropylene by conventional equipment, unlike the platy clays where special equipment is needed, hence, is more costly.

As defined herein, montmorillonite is a 2:1 layered smectic clay, which is the type of silicate normally used in polymer-silicate nanocomposites. Platy nanoclay materials, such as montmorillonite, provide high strength composites. These nanocomposites are not brittle and lower weight percentages are needed. However, special equipment and limited compatibility is reported. Also, it was reported that for a filler loading of 4.8%, the relative permeability dropped about 80%. Hence, e.g., nylon-6 exfoliated nanocomposites with improved gas barrier properties have been commercialized for food packaging. Also, polyimide-layered silicate nanocomposites display a 10-fold decrease in permeability toward water vapor at 2% clay loading. On the other hand, Halloysite nanotubes have all the advantages that platy nanoclays provide, but they are processed on standard equipment with broad compatibility and lower processing cost. The unique structure of HNT nanotubes can be effective in enhancing the properties of polypropylene, such as the heat distortion temperature (HDT).

The term "nanocomposite" is intended to include a composite material with at least one component being an inorganic nanoparticle, such as Halloysite nanotubes embedded or blended within a hydrophobic polymer, such as polypropylene (PP). The term "mixed-matrix" membrane refers to membranes with nanotubes as fillers in a polymer matrix where the transport through them is a solution diffusion mechanism, which would improve their selectivity. The new mixed-matrix nanocomposite membrane is made from a hydrophobic polymer (such as polypropylene) blended with a hydrophobic nanomaterial, viz., either Halloysite nanotubes or PP-grafted maleic anhydride nano-layered silica clay (Ma-Si).

An extrusion and post extrusion-stretching method is used to prepare the nanocomposite mixed-matrix membranes. The compositions are first extruded while being stretched into thin films during the extrusion process. Then, these thin films are used as precursors, and they undergo a complex post-extrusion processing stage. Post-extrusion processing of extruded polypropylene (PP) nanocomposites with HNT and Ma-Si loadings ranging from 0.0% to 15% in the nanocomposite produces microporous mixed-matrix membranes with high fluxes. The post-extrusion process further includes annealing the extruded thin film at 140° C., followed by cold-stretching at room temperature, followed by hot-stretching at 110° C. to 140° C., and finally, heat-setting the stretched film while it is restrained under load at about 145° C. Moderate and combined cold and hot-stretching with a stretch ratio (i.e. % hot stretching %/(cold stretching %+hot. Stretching %) of about 0.7 to 0.8 produces a very permeable, microporous, nanocomposite mixed-matrix membrane. However, excessive cold and/or hot-stretching during processing results in membranes that have lower fluxes.

In view of the problems of membrane technology, the inventor has opted to use Halloysite nanotubes (HNT) or polypropylene-grafted maleic anhydride nano-layered silicate (Ma-Si) nanofillers with polypropylene in a "mixed-matrix" by melt extrusion to prepare nanocomposite films and transform the same by complex extrusion and post-extrusion processing into a microporous hydrophobic nanocomposite mixed-matrix membrane. Polypropylene was selected because of its low cost ease of processing, good mechanical and thermal properties, and good clarity. HNTs were also selected, and it is a preferred nanomaterial because of its relatively low cost compared to CNTs (carbon nanotubes) and other nanomaterials, ease of functionalization compared to smectite clays, its good and unique configuration as hollow tubes, and its ease of processing with polypropylene.

The polypropylene/nanofiller mixed-matrix nanocomposite membranes are hydrophobic and make very good Membrane Distillation (MD) membranes. The following examples will further illustrate the nanocomposite mixed-matrix membranes.

Example 1

Preparation of Mixed-Matrix Nanocomposite PP Precursor Thin Films

Prior to extruding the various blends comprising Polypropylene (PP) homopolymer grade HF029 and the nanofillers, blending the polypropylene with different percentages of the nanomaterial, master batches were prepared, such as a Halloysite nanotube (HNT) master batch containing 30% HNT in PP (Exxon-Mobile PP 1024-E4). Similarly, a polypropylene-grafted maleic anhydride nano-layered silica (Ma-Si) master batch was prepared, which was a master batch containing 50% nano layered silica in PP-grafted Maleic anhydride (PP/Ma-Si). The different blends were then prepared by mixing the corresponding master batch with sufficient pure polypropylene to obtain the desired nanofiller loading in the blends, where the percentages of the nanomaterial in the nanocomposite range between 0.0% (pure polypropylene without a nanofiller) to 15% nanofiller by weight was carried out. Then, the blended mixtures were pelletized using a pelletizer. Then, the extrusion of different pelletized blends into thin nanocomposite films using a twin-screw extruder was carried out. The HNT™ or Ma-Si nanofiller weight percentages in the blends were 0.0%, 0.9%, 3%, 6%, 9.9%, 12% and 15%.

The procedure and best settings for the extrusion of PP/HNT and PP/Ma-Si blends that gave smooth and uniform thin films free of any voids or defects were as follows. The film was extruded from the extruder die with a slit-setting of about 0.8 mm in thickness and a width of 15 cm. After the film was extruded from the die, it went on a casting roller and on other pick-up system equipment (e.g., Haul-off roller) as shown in FIG. 1. The casting roller was set at a cooling temperature of 80° C. The casting roller was brought as close as possible to the twin-screw extruder die, which was a distance of about 5.5 cm. The maximum speed of the casting roller was 4.0 m/min, and the pick-up roller speed was 4.6 m/min, with drawdown rate ranging from 9.76-12.96. The extrusion linear speed was between 0.21 cm/min to 0.41 cm/min. The extruder temperature was set at 200° C. to 230° C., which gave a melting temperature of the blends about 175° C. to 190° C., which is close to the melting temperature of PP HF029 homopolymer of 160° C. Samples of different blends required different extruder settings in terms of temperature, pressure, and other variables to obtain similar thicknesses. Final film thickness ranged from 0.06-0.07 mm, and the final width of the extruded and stretched film ranged from 11.0-11.5 mm.

Example 2

Post-Extrusion Processing of the Mixed-Matrix Nanocomposite PP Thin Films

In order to improve the permeability and other properties (e.g., the mechanical, physical, thermal and morphological properties) of these dense and non-porous nanocomposite films, they were used as precursors to be transformed into porous, open-celled microporous films by further treatment, where they were forced to undergo a complex post-extrusion processing. This included annealing at elevated temperature, followed by cold stretching at room temperature, followed by hot stretching at elevated temperature, followed by heat-setting at a temperature close to polypropylene's melting point. The above procedure was done inside an Environmental Chamber, which was attached to the Testometric Mechanical Testing Machine, where the rate of stretching and temperature can be controlled. Samples were prepared from extruded films and were then fixed to the assembled grips. The length between the grips was 100 mm. The grip assembly holding the sample was then suspended in an oven preheated at 140° C. The sample or the precursor was annealed at 140° C. for 30 min under no load. This is the annealing stage that was applied for all the samples. The sample was then cooled at room temperature (RT) for 10 minutes. The cooled, annealed sample was then stretched at room temperature to different cold extension percentages at a stretch rate of 5.0 mm/min. After stretching, the sample was then allowed to relax at RT for 10 minutes under no load. The cold stretched sample was then used for hot stretching in the oven at 140° C. at different hot extension percentages based on the original length of the sample. The sample was then put in the oven at 140° C. for 10 minutes under the load of the bottom grips only. After 10 minutes, the sample was removed from the oven and cooled at RT for 10 minutes. After the hot stretching procedure was completed, the stretched sample was allowed to heat-set at 145° C. for another 30 minutes under load, after which the sample was removed. After the sample was cooled down to room temperature, it was then measured for thickness, length, and width, and was then prepared for permeability measurement to both water vapor and methanol flux, and for measurement of mechanical properties using a mechanical testing machine, namely, the Testometric Mechanical Testing machine.

Post-extrusion processing conditions differ for different blends and for different nanocomposite films. For example, the cold stretching ranged from 10 to 40%, while the hot stretching ranged from 25 to 200% at a hot temperature range of about 110° C. to 150° C. These variations were necessary in order to get optimum performance of the various nanocomposite mixed-matrix membranes of different blends in terms of mass transfer of liquids (such as methanol) and gases (such as water vapor) through them.

Example 3

Effect of Post-Extrusion Processing on the Mechanical Properties of the Mixed-Matrix Nanocomposite PP Samples Containing Different Percentages of HNT The procedure in Example 2 of cold stretching followed by hot stretching is referred to as non-restrained stretching, where the cold and hot stretched sample was not maintained under load after stretching until the complete relaxation of the stretched film takes place. On the other hand, restrained samples were also prepared, where the sample was maintained under load after cold stretching, and also after hot stretching, until complete relaxation. Therefore, further post-extrusion processing and performance-evaluation of the selected samples was carried out. The performance evaluation included the measurement of the mechanical properties, such as tensile strength and % elongation at break. Table 1 shows the mechanical properties of samples after they have been exposed to the following four cases of post-extrusion processing.

Case 1: No post-extrusion processing to the extruded films or precursor.

Case 2: The extruded samples were hot stretched only to about 150% at 140° C., then allowed to heat-set at 140° C. for 10 minutes, and the stretching magnitude was restrained at 140° C. while it was under full load.

Case 3: The extruded samples were first cold stretched to about 20% at RT at a rate of 5 mm/min, and this elongation was maintained under load. This was followed by a hot stretch of about 150% at 140° C. at a rate of about 3.36% to 34%/min, and the stretched sample was then heat-set and restrained at 140° C. for 10 minutes, while it was under full load.

Case 4: The extruded samples were first cold stretched to about 20% at RT at a rate of 5 mm/min, followed by a hot stretch of about 150% at 140° C. at a rate of about 3.36% to 34%/min. The stretched sample was heat-set at 140° C. for 10 minutes. The cold stretching and hot Stretching were not restrained under load.

Table 1 shows that samples from the various blends with no post-extrusion processing (Case 1) had the lowest values of tensile strength, compared to samples exposed to post-extrusion processing. For example, the samples that were only exposed to restrained cold stretching followed by restrained hot stretching (Case 3) had the highest tensile strength, compared to samples exposed to other post-extrusion processing. For example, the samples that were only exposed to restrained cold stretching followed by restrained hot stretching (Case 3) had the highest tensile strength values, ranging from about 52 N/mm$^2$ for 50% HNT/PP blend (this gives the percent loading of HNT in the nanocomposite a 15% loading), to about 163 N/mm$^2$ for 0.0% HNT/PP blend (HNT loading percent in the nanocomposite is 0.0%). On the other hand, samples that were only exposed to restrained hot stretching (Case 2) showed lower tensile strength than Cases 3 and 4. However, samples from Cases 3 and 4 were still superior to samples in Case 1 that were not exposed to any post-extrusion treatment, where the tensile strength ranged from about 20.72 N/mm$^2$ for 50% HNT/PP blend to about 37.39 N/mm$^2$ for 0.0% HNT/PP blend. This indicated that post-extrusion processing and treatment provide very strong nanocomposite thin films. However, the significant increase of tensile strength in the samples that were exposed to post-extrusion processing of Cases 2, 3, and 4, which were about 3 to 4 times the tensile strength of Case 1, resulted in a sharp drop of their elasticity. For example, samples with no post-extrusion processing (as in Case 1) had elongation at break ranging from 470.5% to 607.1% for all blends, compared to Cases 2, 3, and 4, where the elongation at break ranged from about 23% to 70% for all blends, as shown in Table 1. The elastic modulus for the various blend samples differed for the different cases of post-extrusion processing. It ranged from 859.98-157.1 N/mm$^2$ for Case 1, 316.05-573.9 N/mm$^2$ for Case 2, 344.08-773.5 N/mm$^2$ for Case 3, and (222.15-446.22) N/mm$^2$ for Case 4.

Figure 2:
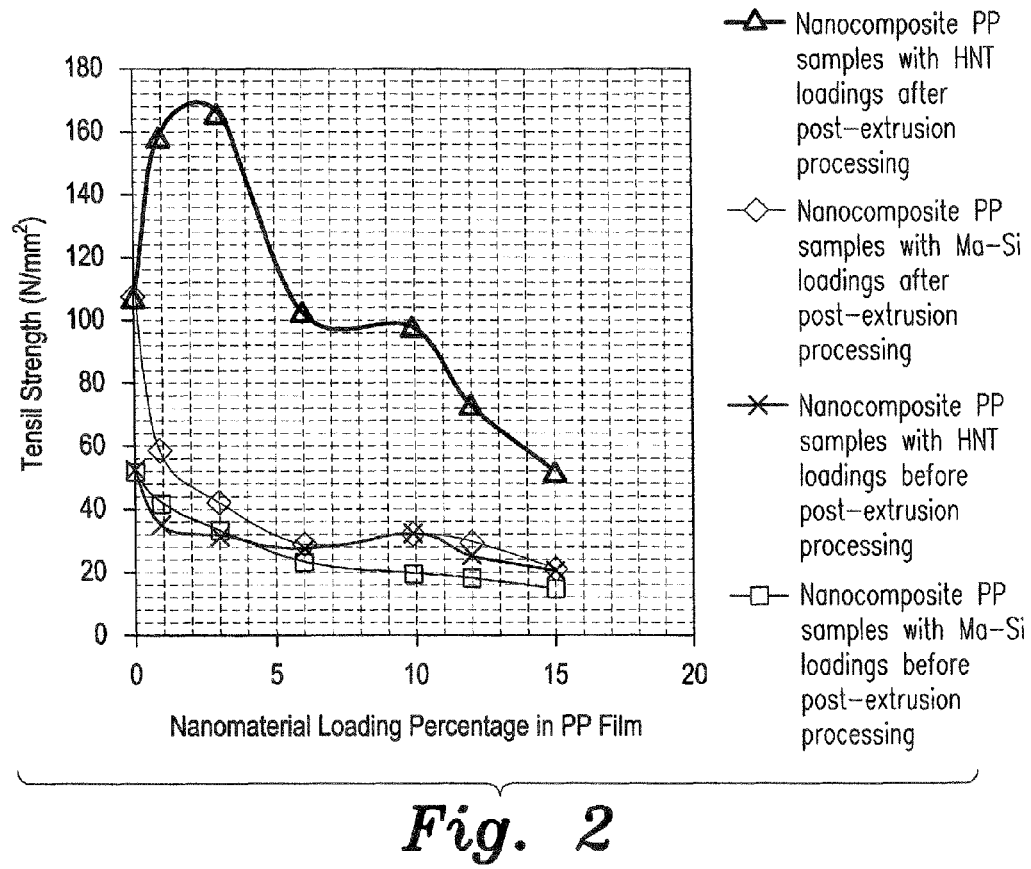
FIG. 2 is a graph comparing tensile strength as a function of nanofiller content both with and without post-extrusion processing of nanocomposite mixed-matrix membranes according to the present invention.
Figure 3:
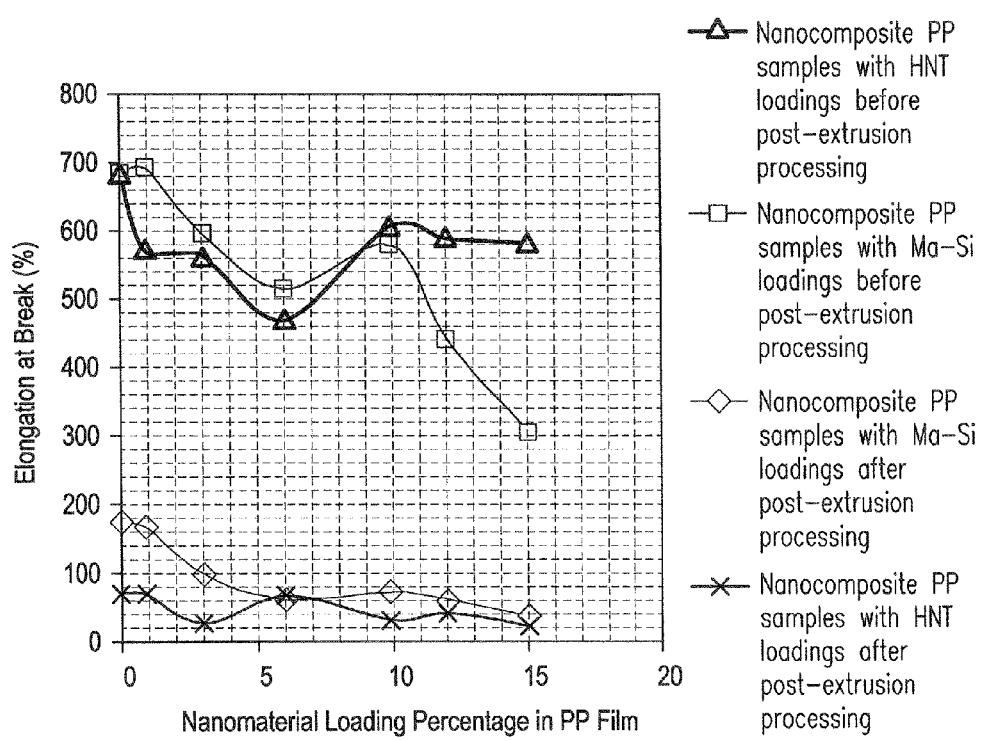
FIG. 3 is a graph showing elongation at break as a function of nanofiller content both with and without post-extrusion processing of nanocomposite mixed-matrix membranes according to the present invention.

Table 1 shows that as the percentage of HNT in the blend increased from 0.0 percentage to 15%, the tensile strength decreased for all blends by about 42% to 67%. The data also showed that the percentage elongation decreased for all blends by about the same ratio, except for Case 1, where there was no post-extrusion processing. Hence, there was no drop in percentage elongation. The results showed that the post-extrusion processing was the controlling factor for the mechanical properties of the various PP/HNT nanocomposite films.

processing. The percent loading of Ma-Si in the nanocomposites ranges from 0.0% to 15%. The effect of % Ma-Si on the mechanical properties of the nanocomposite films (such as tensile strength, % elongation at break, yield stress, and modulus of elasticity) are also shown in Tables 2 and 3. The results show that as % Ma-Si increases from 0.0% to 15%, the tensile strength decreases quite significantly from 51.9 to 14.74 N/mm$^2$, and the % elongation decreases by almost a factor of two, even before post-extrusion processing. The tensile strength increased after post-extrusion by almost a factor of two, while the % elongation decreased by a factor of four to five. FIGS. 2 and 3 show the effect of post-extrusion processing on the tensile strength and % elongation to break of the nanocomposite PP films with different percentages of HNT and Ma-Si loading in PP film.

TABLE 2

Mechanical properties of selected nanocomposites of PP with different percentages of Ma-Si loadings before post-extrusion processing

| Sample Designation | Ma-Si % | Tensile Strength N/mm$^2$ | Elongation at Break | Yield Stress N/mm$^2$ | Young's Modulus N/mm$^2$ |
|---|---|---|---|---|---|
| 18 | 0.0 | 51.9 | 685.58 | 23.37 | 1297.0 |
| 1-1 | 0.9 | 41.75 | 692.77 | 23.18 | 1120.0 |
| 2-1 | 3.0 | 33.49 | 597.50 | 16.72 | 798.5 |
| 3-1 | 6.0 | 23.36 | 515.57 | 15.95 | 931.9 |
| 4-1 | 9.9 | 19.67 | 580.33 | 13.13 | 755.5 |
| 5-1 | 12.0 | 18.22 | 441.76 | 14.965 | 927.7 |
| 6-1 | 15.0 | 14.74 | 306.15 | 14.07 | 877.4 |

TABLE 1

Effect of post-extrusion treatment on selected PP/HNT nanocomposite samples

| Sample No. | % HNT in Sample | Case 1[a] TS[e] (N/mm$^2$) | Case 1[a] E[f] (%) | Case 2[b] RHS[g] (%/min) | Case 2[b] TS[e] (N/mm$^2$) | Case 2[b] E[f] (%) | Case 3[c] RHS[g] (%/min) | Case 3[c] TS[e] (N/mm$^2$) | Case 3[c] E[f] (%) | Case 4[d] TS[e] (N/mm$^2$) | Case 4[d] E[f] (%) |
|---|---|---|---|---|---|---|---|---|---|---|---|
| 18 | 0 | 37.39 | 576.31 | 9.09 | 139.66 | 69.68 | 3.36 | 162.9 | 70.09 | 119.67 | 56.93 |
| 11A | 0.9 | 35.076 | 573.99 | 17.3 | 133.46 | 49.04 | 7.2 | 158.43 | 68.93 | 124.75 | 35.324 |
| 10B | 3.0 | 31.337 | 563.17 | 7.99 | 111.03 | 24.587 | 8.75 | 166.03 | 27.102 | 113.14 | 39.97 |
| 1C | 6.0 | 27.659 | 470.53 | 8.5 | 88.9 | 48.813 | 5.00 | 102.49 | 67.322 | 108.58 | 46.34 |
| 1D | 9.9 | 32.328 | 607.13 | 7.29 | 54.49 | 31.44 | 34.00 | 97.81 | 32.351 | 72.41 | 33.09 |
| 1E | 12.0 | 25.245 | 590.99 | 12.1 | 67.36 | 28.607 | 33.00 | 72.96 | 41.683 | 87.54 | 34.43 |
| 1F | 15.0 | 20.721 | 582.54 | 7.14 | 48.79 | 27.491 | 13.4 | 51.988 | 22.854 | 70.47 | 33.31 |

[a]Case 1: No post-extrusion stretching (precursors)
[b]Case 2: Restrained 0.0% cold and 150% hot stretching at 140° C.
[c]Case 3: Restrained 20% cold and 150% hot stretching at 140° C. – Cold Stretch Rate = 5 mm/min
[d]Case 4: Non-restrained 20% cold and 150% hot stretching at 140° C.
[e]Tensile Strength
[f]Elongation
[g]Rate of Hot Stretch Example 4

Effect of Post-Extrusion Processing on the Mechanical Properties of the Nanocomposite Mixed-Matrix PP Samples Containing Different Percentages of Ma-Si The same procedure of Example 2 was followed to study the effect of post-extrusion on the mechanical properties of nanocomposites made from polypropylene and maleic anhydride-layered silicate (PP/Ma-Si). Tables 2 and 3 show the details of post-extrusion processing conditions of the various nanocomposites with different percentages of maleic anhydride-silicate loadings before and after any post-extrusion

TABLE 3

Mechanical properties of selected nanocomposites of PP with different percentages of Ma-Si loadings after post-extrusion processing*

| Sample Designation | Ma-Si % | Tensile Strength N/mm$^2$ | Elongation at Break | Yield Stress N/mm$^2$ | Young's Modulus N/mm$^2$ |
|---|---|---|---|---|---|
| 18 | 0.0 | 107.47 | 173.93 | 24.942 | 511.63 |
| 1-1 | 0.9 | 58.34 | 167.01 | 13.258 | 328.91 |
| 2-1 | 3.0 | 42.06 | 98.58 | 12.044 | 344.46 |
| 3-1 | 6.0 | 29.18 | 62.03 | 10.160 | 358.91 |
| 4-1 | 9.9 | 32.24 | 73.75 | 12.377 | 409.88 |

TABLE 3-continued

Mechanical properties of selected nanocomposites of PP with different percentages of Ma-Si loadings after post-extrusion processing*

| Sample Designation | Ma-Si % | Tensile Strength N/mm² | Elongation at Break | Yield Stress N/mm² | Young's Modulus N/mm² |
|---|---|---|---|---|---|
| 5-1 | 12.0 | 29.61 | 60.80 | 10.842 | 345.37 |
| 6-1 | 15.0 | 21.03 | 38.93 | 8.796 | 281.68 |

*Post-extrusion for all samples is 20% cold-stretch, followed by 80% hot-stretch at 140° C.

Example 5

WVT of Nanocomposite Mixed-Matrix Membrane Samples with Different Percentages of HNT and Ma-Si and with Post-Extrusion Processing The Water Vapor Transmission (WVT) test was conducted at 38° C. in accordance with standard procedures (ASTM E 96/E 96M-05, Water Method). Table 4 shows the WVT of different nanocomposite membrane samples with different HNT loadings of PP ranging from 0.0% to 15% by weight. These tests were conducted for samples that were exposed to almost optimum post-extrusion processing. Table 4 shows that as the percent of HNT increases from 0.0% to 15%, the percent of hot-stretching at 130° C. decreases from almost 150% to 53.4%, respectively, while the percent of cold-stretching is maintained from 22% to about 27.6%. Table 4 and FIG. 4 also show that the WVT for the corresponding samples ranges from about 1.06 g/m²/h for samples with 0.0% HNT loading to about 89.33 g/m·h for sample with 15% HNT loading. This clearly indicates that the presence of HNT in the nanocomposite increases the permeability of the nanocomposite membrane to WVT quite significantly. However, the curve in FIG. 4 also shows that the flux tends to reach a plateau beyond an HNT loading of 12%. The permeabilities of these samples range from 0.275 to 93.668×10⁻³ g/100 cm·d·psi for 0.0% to 15% HNT samples, respectively.

Figure 4:
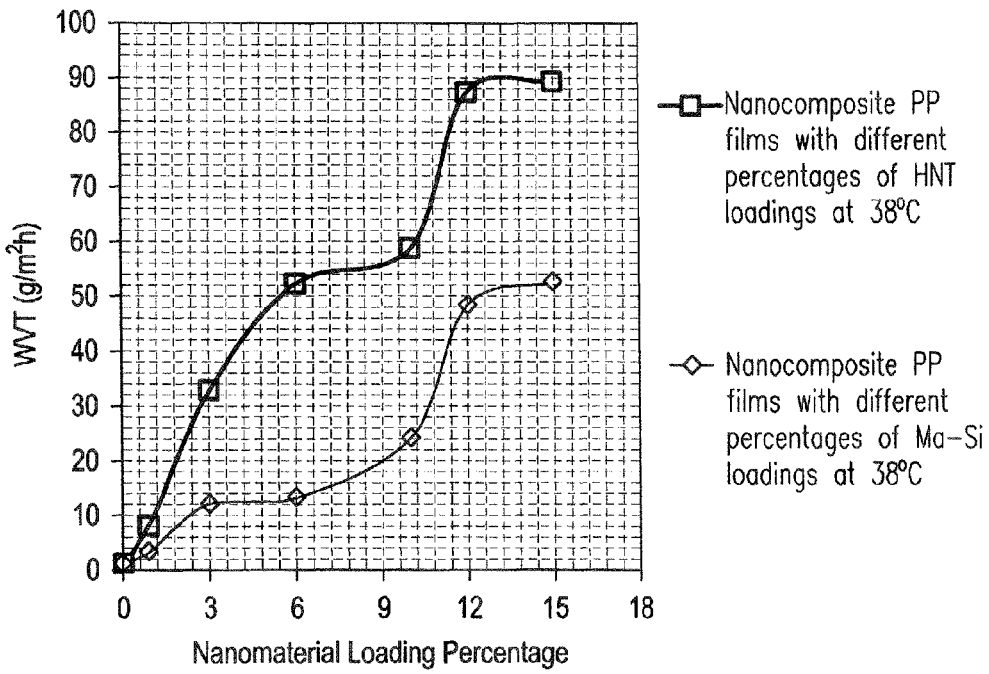
FIG. 4 is a graph showing water vapor transmission (WVT) at 38° C. of nanocomposite mixed-matrix membranes according to the present invention.

Table 5 shows the water vapor transmission (WVT) of different nanocomposite membrane samples with different Ma-Si loadings of PP ranging from 0.0% to 15% by weight. The data show that as the % Ma-Si increases from 0.0% to 15% in the nanocomposite, the WVT increases from 1.06 g/m²/h to 52.69 g/m²/h at 38° C. Table 5 shows that WVT increases sharply as % Ma-Si gets higher than 6%. FIG. 4 shows the data on WVT for the nanocomposite samples of both nanomaterials, namely, HNT and Ma-Si. The data show the superiority of HNT over Ma-Si in rendering more permeable nanocomposite membranes. It should be pointed out that HNT is in a hollow tubular form while Ma-Si is in a particle form, and hence, a different morphology is formed in these nanocomposite films upon extrusion and post-extrusion processing. This might result in different pore sizes and pore size distribution that results in more flux in the case of HNT-loaded nanocomposites. Moreover, HNT-loaded nanocomposite membranes give higher tensile strength by a factor of 3 to 4 than those loaded with Ma-Si when these samples are exposed to post-extrusion processing.

TABLE 4

Effect of post-extrusion processing conditions on water vapor transmission (WVT) at 38° C. for selected HNT-loaded nanocomposite samples

| Sample | HNT % | Cold Stretch % | Hot stretch at 130° C. % | Thickness cm | Area m² | WVT at 38° C. g/m²/h |
|---|---|---|---|---|---|---|
| 18 | 0.0 | 25.6 | 149.8 | 0.0010 | 0.0012 | 1.06 |
| 11A | 0.9 | 27.5 | 166.4 | 0.0010 | 0.0012 | 8.05 |
| 10B | 3.0 | 27.0 | 100.0 | 0.0030 | 0.0012 | 32.74 |
| 1C | 6.0 | 24.4 | 115.7 | 0.0030 | 0.0012 | 52.16 |
| ID | 9.9 | 22.0 | 87.6 | 0.0040 | 0.0012 | 58.72 |
| IE | 12.0 | 27.6 | 55.5 | 0.0045 | 0.0012 | 87.44 |
| IF | 15.0 | 26.3 | 53.4 | 0.0042 | 0.0012 | 89.33 |

Vapor pressure at 38° C.: 0.961 psi.

TABLE 5

Effect of post-extrusion processing conditions on water vapor transmission (WVT) at 38° C. for selected Ma-Si-loaded nanocomposite samples

| Sample | Ma-Si % | Cold Stretch % | Hot stretch at 130° C. % | Thickness cm | Area m² | WVT at 38° C. g/m²/h |
|---|---|---|---|---|---|---|
| 18 | 0.0 | 25.6 | 149.8 | 0.0010 | 0.0012 | 1.06 |
| 1-1 | 0.9 | 12.6 | 29.3 | 0.0054 | 0.0012 | 3.33 |
| 2-1 | 3.0 | 16.7 | 30.9 | 0.0071 | 0.0012 | 12.03 |
| 3-1 | 6.0 | 13.1 | 37.5 | 0.0063 | 0.0012 | 13.20 |
| 4-1 | 9.9 | 15.7 | 29.0 | 0.0091 | 0.0012 | 24.18 |
| 5-1 | 12.0 | 20.9 | 24.7 | 0.0056 | 0.0012 | 48.37 |
| 6-1 | 15.0 | 13.5 | 25.6 | 0.0083 | 0.0012 | 52.69 |

Vapor pressure at 38° C.: 0.961 psi.

Example 6

Methanol Flux Through the Selected Nanocomposite Mixed-Matrix Membrane Samples with Different Loadings of HNT and Ma-Si The prepared nanocomposite mixed-matrix membranes from polypropylene (PP) with HNT (PP/HNT) and Ma-Si (PP/Ma-Si) nanofillers are hydrophobic. Therefore, a Sterlitech high-pressure stirred cell HP4750 was connected with a nitrogen cylinder to measure the flux of methanol at room temperature. The major specifications of the Sterlitech HP4750 permeability cell are as follows. Membrane size: a nominal 49 mm; active membrane area: 14.6 cm²; processing volume: up to 300 ml; maximum pressure: 1000 psig with high-pressure clamps; maximum temperature: 121° C. at 800 psig; cell diameter: 5.1 cm; cell height: 19.9 cm; cell width with high-pressure couplings: 14.6 cm.

Sample 18, which is purely polypropylene HF029 homopolymer thin film and contains zero nanomaterial, and sample 1F, which is loaded with 15% HNT, and sample 1-6, which is loaded with 15% Ma-Si, were chosen to show the detailed post-extrusion processing conditions and their effect on the methanol flux through these mixed-matrix nanocomposite membranes, and on their permeability.

The results in Table 6 show that the flux of methanol through sample 18 with 0.0% loading of nanomaterial is dependent on the post-extrusion stretching conditions. The data show the ideal hot-stretching temperature to be about 110° C., and the cold-stretch is about 37.31%, followed with a hot-stretch of about 79.7%, based on the length of the cold-stretched sample. The data also show that neither hot nor cold overstretching necessarily yields higher fluxes. For example, at the same hot-stretching temperature of 110° C., when the sample was cold-stretched 37.31%, followed by 79.71% hot-stretching, a much higher flux of 21.774 kg/m²/h, was obtained than when it was cold-stretched to 65%, followed by 87.11% hot-stretching, which produced a flux of 7.83 kg/m²/h, or when it was cold-stretched 34.3% followed by 151.8% hot-stretching, producing a flux of 13.5 kg/m²/h at 290 psi. Table 6 also shows that for Sample 18, when the hot-stretching temperature exceeds 130° C., the flux of methanol approaches zero for all levels of stretching and at all levels of applied pressure up to 300 psi.

The results in Table 7 show that the flux of methanol through sample 1F, which is loaded with 15.0% HNT, is also dependent on the post-extrusion stretching conditions. Again, the data show that a hot-stretching temperature of 140° C. is optimum for this sample. For example, a cold-stretch of 25%, followed by a hot-stretch of 105.6% at 140° C. based on the original length of the sample, produced a flux of 765.97 kg/m²/h, compared to a sample with 27.89% cold-stretch followed by a 84.2% hot-stretch at 110° C., which produced a flux of 471.93 kg/m²/h at an applied pressure of 145 psi. Also, a cold- or hot-stretch alone produced very low flux values, where a 20.1% cold-stretch only produced a flux of 85.137 kg/m²/h, and an 18.53% hot-stretch only at 140° C. produced 64.95 kg/m²/h flux. Hence, a combined cold- and hot-stretch are needed to produce mixed-matrix membranes with high fluxes.

The results in Table 8 show that for a sample with 15% Ma-Si loading, cold stretching of about 16% to 17% and a hot stretch of about 56% to 64% at a hot-stretching temperature of 110° C. to 130° C. give optimum methanol flux, ranging from about 167.3 kg/m²/h to about 175.2 kg/m²/h at a pressure of 145 psi. However, higher cold stretching and higher hot stretching at higher hot temperature does not give higher flux of methanol, but on the contrary, it gives lower flux. For example a cold stretch of 21.7% followed by a hot stretch of 84.1% at high hot temperature of 140° C. gives lower methanol flux of 105.6 kg/m²/h at 145 psi pressure.

Figure 5:
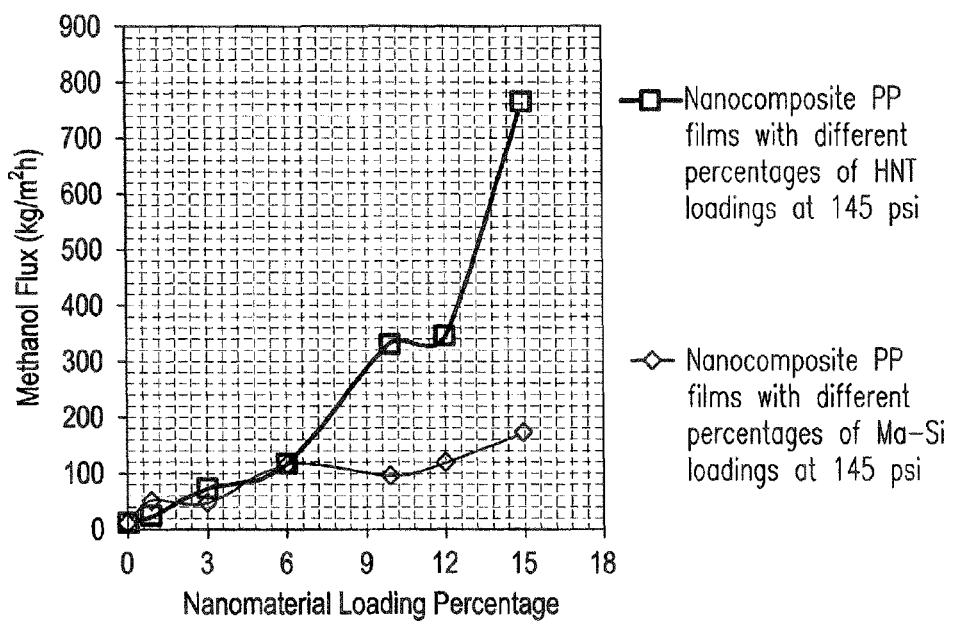
FIG. 5 is a graph showing methanol flux of nanocomposite mixed-matrix membranes according to the present invention.

FIG. 5 shows the effect of nanomaterials of Halloysite nanotubes (HNT) and maleic anhydride-silicate (Ma-Si) loading percentages on the methanol flux at an applied pressure of 145 psi of nanocomposite mixed-matrix PP samples at optimum post-extrusion conditions. The data shows very clearly the superiority of the PP/HNT over the PP/Ma-Si in improving the permeability of the microporous nanocomposite mixed-matrix membranes. The same behavior was also observed previously, as shown in FIG. 4, regarding the water vapor transmission (WVT) where HNT-loaded nanocomposites outperformed Ma-Si-loaded nanocomposites by almost a factor of two. The data in FIG. 5 also show that up to a loading of about 6% of both HNT and Ma-Si in the nanocomposites, the flux was almost the same. However, when the loading of HNT and Ma-Si in the nanocomposite exceeded 6%, the difference became very significant, where HNT-loaded membranes surpassed Ma-Si-loaded membranes by a factor of three to four. This might be due to the structure of the HNT over Ma-Si, where HNT is a hollow tube with internal diameter ranging from 16 nm to 50 nm and outer diameter ranging from 40 nm to 300 nm and a length of 1000 nm to 5000 nm, while Ma-Si is a platy type that has an outer diameter of 100 nm and an aspect ratio of 10:1 that might result in more tortuous path.

Figure 6A:
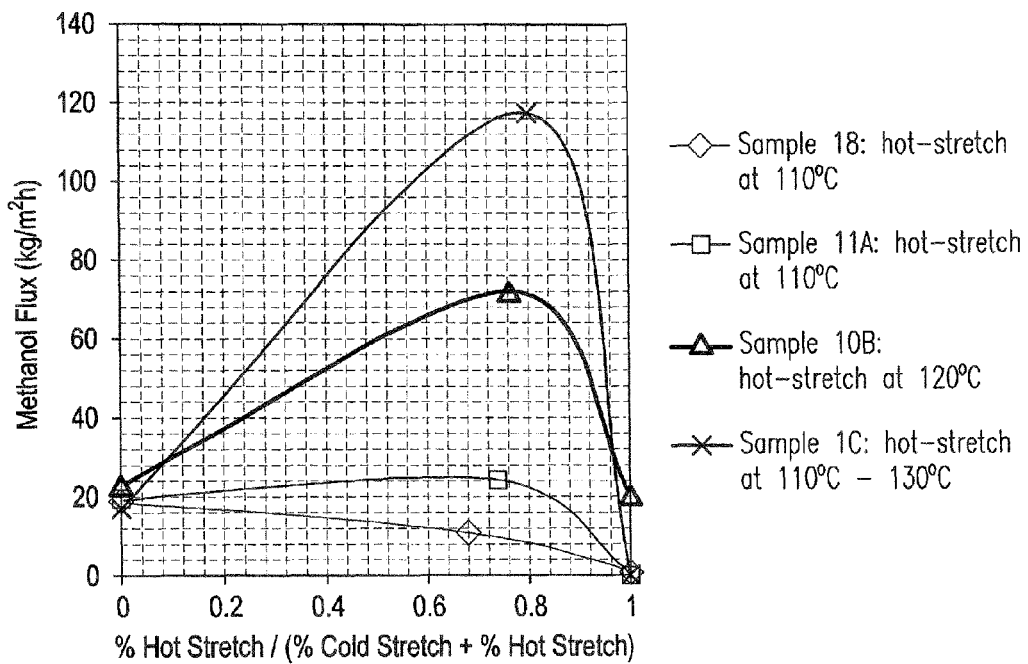
FIG. 6A is a graph showing methanol flux as a function of the post-extrusion extension ratio (% hot stretch/(% Cold stretch+% hot stretch) for various samples of nanocomposite mixed-matrix membranes according to the present invention with hot stretch at 110-130° C.
Figure 6B:
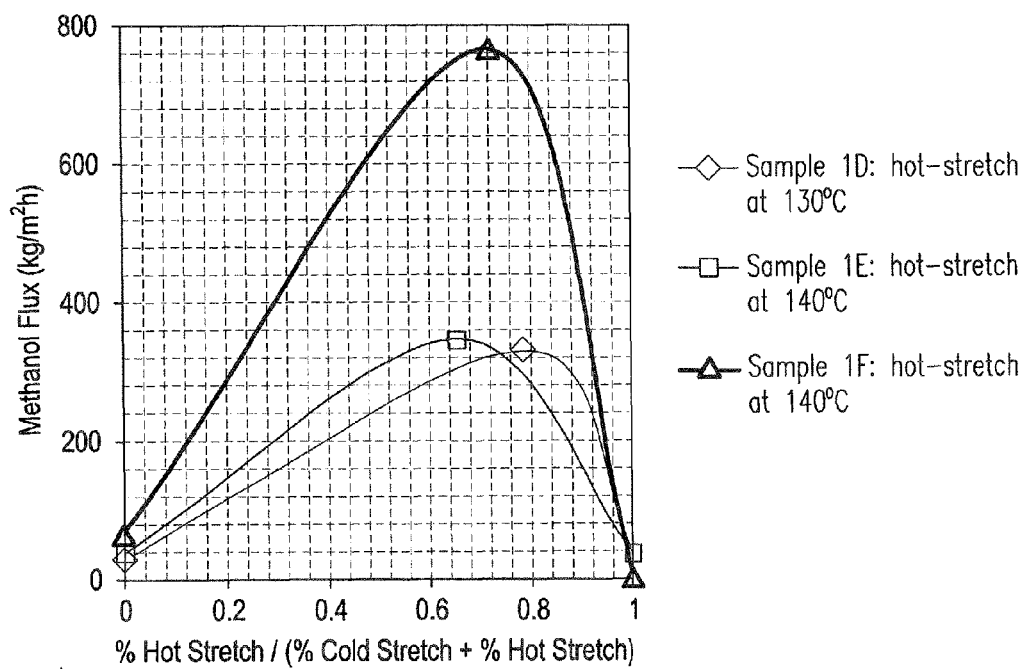
FIG. 6B is a graph showing methanol flux as a function of the post-extrusion extension ratio (% hot stretch/(% Cold stretch+% hot stretch) for some additional samples of nanocomposite mixed-matrix membranes according to the present invention with hot stretch at 130-140° C.

FIG. 6 shows the effect of optimum post-extrusion extension ratios (i.e., Hot-Stretch/(Cold-Stretch+Hot-Stretch)) on the methanol flux of nanocomposites mixed-matrix with different loadings of HNT in the nanocomposite. The hot extensions of the various samples were conducted at the different temperatures that produce the optimal methanol flux. FIG. 6A shows that with a low HNT loading ranging from 0.0% to 6.0% in the nanocomposite, cold-stretching alone with a stretch ratio of 0.0 produces nanocomposite membranes that are more permeable than hot-stretching alone with stretch ratio of 1.0. It also appears that for this kind of nanocomposite membranes, with HNT loadings ranging from 0.0% to 6.0%, a stretch ratio ranging from 0.75 to 0.8 is optimal, provided that the hot-stretching is conducted at the optimum stretching temperature. However, for higher HNT loadings in the nanocomposite membrane, i.e., from 10% to 15%, the stretching ratio that produces optimum flux is slightly lower, ranging from 0.7 to 0.75, as can be seen in FIG. 6B. Finally, Sample 18, which is purely PP and has 0% HNT, seems to be more permeable with cold stretching alone or with a stretch ratio of 0.0 than with any other ratio.

TABLE 6

Methanol Flux and Permeability of pure polypropylene

| Cold-Stretch (%) | Hot-Stretch %* | Hot-Stretch %** | Hot-Stretch ° C. | Thickness (cm) | Pressure (psi) | Methanol Flux kg/m²/h | Methanol Flux cc/100 cm²·d·psi | Permeability (cc/100 cm·d·psi) |
|---|---|---|---|---|---|---|---|---|
| 18.76 | 77.8 | 106.01 | 110 | 0.0031 | 150 | 9.3929 | 18.786 | 0.0604 |
|  |  |  |  |  | 200 | 13.331 | 19.997 |  |
|  |  |  |  |  | 290 | 18.966 | 19.621 |  |
| 34.31 | 84.9 | 148.35 | 110 | 0.0045 | 150 | 6.1358 | 12.272 | 0.0545 |
|  |  |  |  |  | 200 | 8.2849 | 12.427 |  |
|  |  |  |  |  | 290 | 11.261 | 11.649 |  |
| 37.31 | 79.7 | 146.77 | 110 | 0.0023 | 150 | 10.748 | 21.497 | 0.0495 |
|  |  |  |  |  | 200 | 13.656 | 20.485 |  |
|  |  |  |  |  | 290 | 21.774 | 22.525 |  |
| 38.54 | 181.7 | 290.24 | 120 | 0.0017 | 100 | 3.5729 | 10.719 | 0.0210 |
|  |  |  |  |  | 150 | 6.8090 | 13.618 |  |
|  |  |  |  |  | 200 | 7.7699 | 11.655 |  |
|  |  |  |  |  | 250 | 10.584 | 12.701 |  |
|  |  |  |  |  | 300 | 13.091 | 13.091 |  |
| 34.30 | 151.8 | 238.23 | 110 | 0.0014 | 116 | 5.4515 | 14.099 | 0.0186 |
|  |  |  |  |  | 174 | 8.2808 | 14.277 |  |
|  |  |  |  |  | 232 | 11.199 | 14.483 |  |
|  |  |  |  |  | 290 | 13.498 | 13.964 |  |

TABLE 6-continued

Methanol Flux and Permeability of pure polypropylene

| Cold-Stretch (%) | Hot-Stretch %* | Hot-Stretch %** | Hot-Stretch °C. | Thickness (cm) | Pressure (psi) | Methanol Flux kg/m²·h | Methanol Flux cc/100 cm²·d·psi | Permeability (cc/100 cm·d·psi) |
|---|---|---|---|---|---|---|---|---|
| 65.00 | 87.1 | 208.86 | 110 | 0.0021 | 150 | 4.468 | 8.936 | 0.0178 |
|  |  |  |  |  | 200 | 5.555 | 8.326 |  |
|  |  |  |  |  | 290 | 7.828 | 8.095 |  |
| 22.90 | 211.4 | 282.81 | 110 | 0.002 | 150 | 4.143 | 8.287 | 0.0175 |
|  |  |  |  |  | 200 | 5.903 | 8.854 |  |
|  |  |  |  |  | 290 | 8.793 | 9.096 |  |
| 29.70 | 195.1 | 282.74 | 110 | 0.002 | 200 | 3.573 | 5.359 | 0.0098 |
|  |  |  |  |  | 290 | 5.244 | 5.425 |  |
| 39.95 | 240.0 | 375.83 | 110 | 0.0013 | 200 | 0.502 | 0.753 | 0.0033 |
|  |  |  |  |  | 290 | 2.066 | 2.137 |  |
|  |  |  |  |  | 400 | 6.305 | 4.729 |  |
| 25.60 | 179.8 | 213.79 | 130 | 0.0011 | 300 | 2.087 | 2.090 | 0.0023 |
| 43.63 | 173.0 | 292.16 | 130 | 0.0013 | 100-300 | 0 | 0 | 0 |
| 35.00 | 174.7 | 270.90 | 130 | 0.0015 | 150-300 | 0 | 0 | 0 |
| 31.50 | 178.0 | 265.48 | 120 | 0.0016 | 300 | 0.700 | 0.700 | 0.0011 |
| 17.00 | 166.0 | 211.99 | 147 | 0.0017 | 300 | 0.050 | 0.047 | 0.0008 |
| 36.00 | 237.0 | 358.94 | 141 | 0.0015 | 300 | 0.303 | 0.300 | 0.0005 |
| 0 | 0 | 165.00 | 110 | 0.0013 | 350 | 1.134 | 0.9718 | 0.0013 |
| 116.00 | 0 | 0 | 110 | 0.0027 | 350 | 0 | 0 | 0 |
| 32.83 | 0 | 0 | 0 | 0.0050 | 150 | 18.667 | 37.334 | 0.1962 |
|  |  |  |  |  | 300 | 38.671 | 38.617 |  |

*Based on cold stretched length, **Based on original length

TABLE 7

Methanol Flux and Permeability of nanocomposite sample 1F
(polypropylene with 15% HNT nanofiller)

| Cold-Stretch (%) | Hot-Stretch %* | Hot-Stretch %** | Hot-Stretch °C. | Thickness (cm) | Pressure (psi) | Methanol Flux kg/m²·h | Methanol Flux cc/100 cm²·d·psi | Permeability (cc/100 cm·d·psi) |
|---|---|---|---|---|---|---|---|---|
| 25.00 | 64.5 | 105.61 | 140 | 0.0053 | 58 | 370.16 | 1914.6 | 9.2412 |
|  |  |  |  |  | 87 | 498.82 | 1720.1 |  |
|  |  |  |  |  | 116 | 678.60 | 1755.0 |  |
|  |  |  |  |  | 145 | 765.97 | 1584.8 |  |
| 38.80 | 54.9 | 114.97 | 130 | 0.0055 | 58 | 308.79 | 1597.2 | 9.1474 |
|  |  |  |  |  | 87 | 510.79 | 1761.3 |  |
|  |  |  |  |  | 116 | 661.49 | 1710.8 |  |
|  |  |  |  |  | 145 | 765.29 | 1583.4 |  |
| 23.90 | 46.2 | 81.19 | 130 | 0.0056 | 50 | 264.58 | 1587.5 | 8.8900 |
| 24.00 | 51.6 | 88.00 | 120 | 0.0051 | 58 | 318.47 | 1647.3 | 8.0660 |
|  |  |  |  |  | 87 | 457.31 | 156.9 |  |
|  |  |  |  |  | 116 | 623.82 | 1613.3 |  |
|  |  |  |  |  | 145 | 719.58 | 1488.8 |  |
| 26.30 | 53.4 | 93.78 | 130 | 0.0042 | 58 | 327.18 | 1692.3 | 6.9791 |
|  |  |  |  |  | 87 | 474.80 | 1637.2 |  |
|  |  |  |  |  | 116 | 593.62 | 1535.2 |  |
| 27.89 | 44.03 | 84.21 | 110 | 0.0051 | 58 | 230.35 | 1191.4 | 5.4836 |
|  |  |  |  |  | 87 | 324.25 | 1118.1 |  |
|  |  |  |  |  | 116 | 392.43 | 1014.9 |  |
|  |  |  |  |  | 145 | 471.93 | 976.4 |  |
| 20.10 | 0 | 0 | 0 | 0.0070 | 58 | 52.80 | 273.1 | 1.5471 |
|  |  |  |  |  | 87 | 65.59 | 226.2 |  |
|  |  |  |  |  | 116 | 58.63 | 151.6 |  |
|  |  |  |  |  | 145 | 85.14 | 176.2 |  |
| 0 | 0 | 18.53 | 140 | 0.0068 | 58 | 34.56 | 178.7 | 1.0310 |
|  |  |  |  |  | 87 | 45.66 | 157.4 |  |
|  |  |  |  |  | 116 | 58.63 | 151.6 |  |
|  |  |  |  |  | 145 | 64.95 | 134.4 |  |

*Based on cold stretched length, **Based on original length

TABLE 8

Methanol Flux and Permeability of nanocomposite sample 6-1
(polypropylene with 15% maleic anhydride-silicate nanofiller)

| Cold-Stretch (%) | Hot-Stretch %* | Hot-Stretch %** | °C. | Thickness (cm) | Pressure (psi) | Methanol Flux kg/m²/h | cc/100 cm²·d·psi | Permeability (cc/100 cm·d·psi) |
|---|---|---|---|---|---|---|---|---|
| 17.40 | 39.38 | 63.64 | 110 | 0.0074 | 58  | 66.909  | 346.08 | 2.6315 |
|       |       |       |     |        | 87  | 108.24  | 373.24 |        |
|       |       |       |     |        | 116 | 138.05  | 357.02 |        |
|       |       |       |     |        | 145 | 167.28  | 346.10 |        |
| 16.04 | 34.15 | 55.67 | 120 | 0.0067 | 58  | 74.899  | 387.41 | 2.5093 |
|       |       |       |     |        | 87  | 119.48  | 412.01 |        |
|       |       |       |     |        | 116 | 132.97  | 343.89 |        |
|       |       |       |     |        | 145 | 171.47  | 354.76 |        |
| 17.12 | 35    | 58.03 | 130 | 0.0060 | 58  | 7.809   | 371.43 | 2.0736 |
|       |       |       |     |        | 87  | 119.48  | 412.01 |        |
|       |       |       |     |        | 116 | 125.96  | 325.78 |        |
|       |       |       |     |        | 145 | 175.15  | 362.38 |        |
| 18.32 | 46.24 | 73.03 | 140 | 0.0081 | 58  | 64.227  | 332.21 | 1.9740 |
|       |       |       |     |        | 87  | 73.033  | 251.84 |        |
|       |       |       |     |        | 116 | 77.789  | 201.18 |        |
|       |       |       |     |        | 145 | 91.642  | 189.60 |        |
| 21.7  | 51.38 | 84.21 | 140 | 0.0065 | 58  | 49.971  | 258.47 | 1.5934 |
|       |       |       |     |        | 87  | 74.234  | 255.98 |        |
|       |       |       |     |        | 116 | 95.743  | 247.61 |        |
|       |       |       |     |        | 145 | 105.58  | 218.44 |        |

*Based on cold stretched length, **Based on original length

Example 7

Scanning Electron Microscope (SEM) and Morphology of Mixed-Matrix Nanocomposite Samples Loaded with Different Percentages of HNT and Ma-Si The morphology of the prepared microporous nanocomposite mixed-matrix membranes was investigated. SEM was used to produce microscopic images of the various prepared samples. Table 9 shows the properties of the samples for which SEM images were obtained for different HNT and Ma-Si-loaded nanocomposite samples. The data shows the methanol flux through the various prepared microporous nanocomposite mixed-matrix samples under different post-extrusion conditions. The post-extrusion conditions are close to those that produce optimum methanol flux performance. The SEM images of the samples with different loadings of HNT of 0.0%, 6%, and 15% are shown in FIGS. 7A through 9C. Also, the SEM images of the samples with different loadings of Ma-Si of 6% and 15% are shown in FIG. 10A through 11C. The SEM images are shown with magnifications of 20,000, 50,000 and 100,000 for HNT loaded samples and a magnification of 10,000, 30,000 and 50,000 for Ma-Si loaded samples.

Figure 7A:
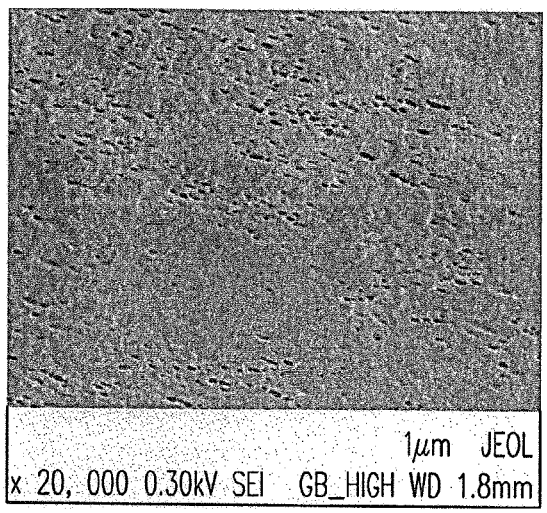
FIGS. 7A, 7B, and 7C are SEM micrographs of nanocomposite mixed-matrix membrane Sample 18 (PP/0.0% HNT) at magnification levels of ×20,000, ×50,000, and ×100,000, respectively.
Figure 7B:
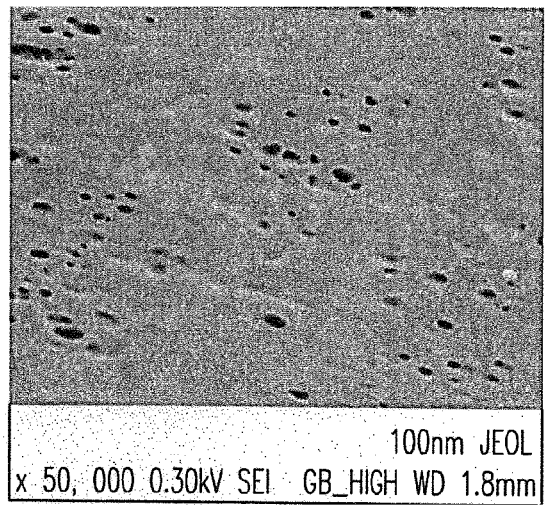
Figure 7C:
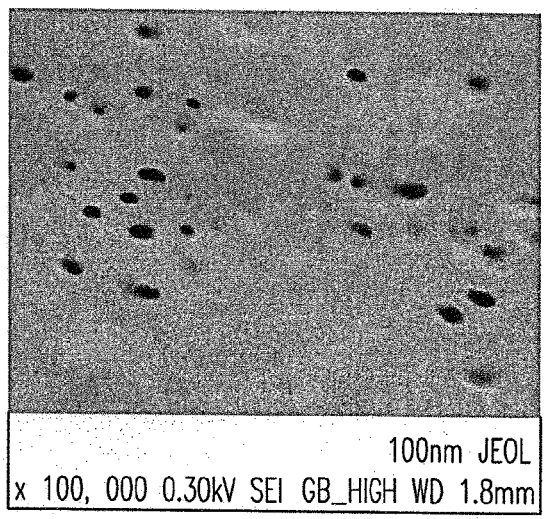
Figure 8A:
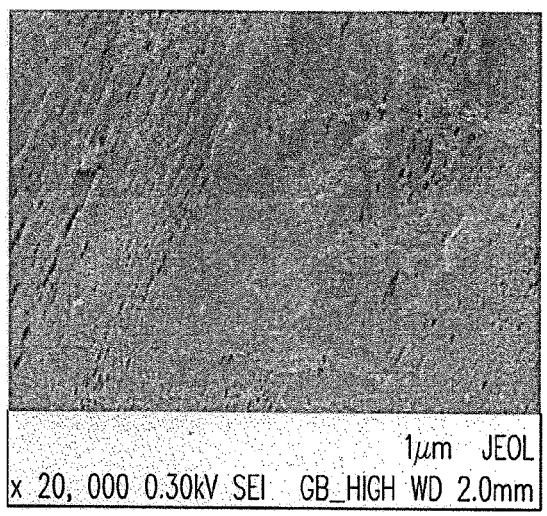
FIGS. 8A, 8B, and 8C are SEM micrographs of nanocomposite mixed-matrix membrane Sample 1C (PP/6.0% HNT) at magnification levels of ×20,000, ×50,000, and ×100,000, respectively.
Figure 8B:
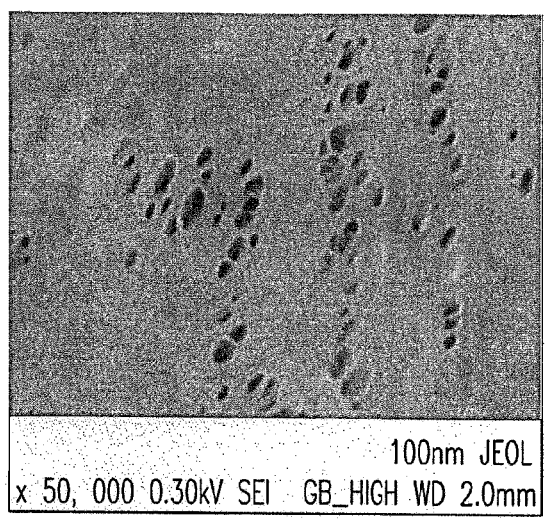
Figure 8C:
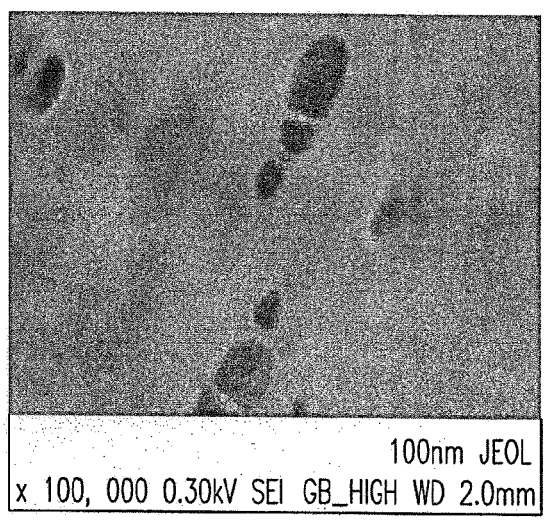
Figure 9A:
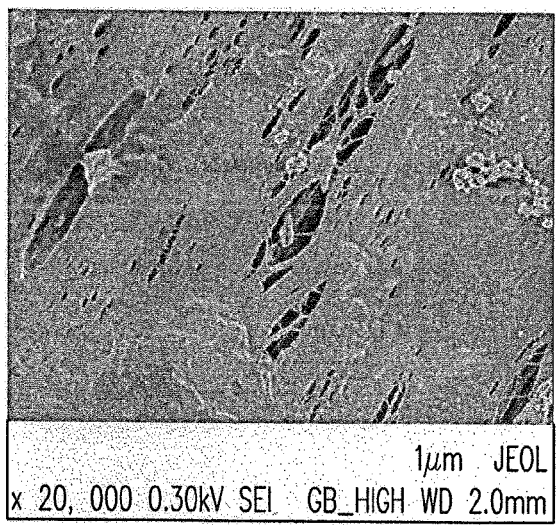
FIGS. 9A, 9B, and 9C are SEM micrographs of nanocomposite mixed-matrix membrane Sample IF (PP/15.0% HNT) at magnification levels of ×20,000, ×50,000, and ×100,000, respectively.
Figure 9B:
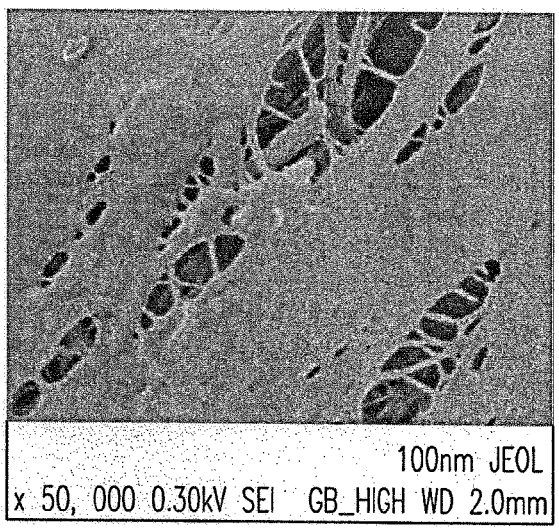
Figure 9C:
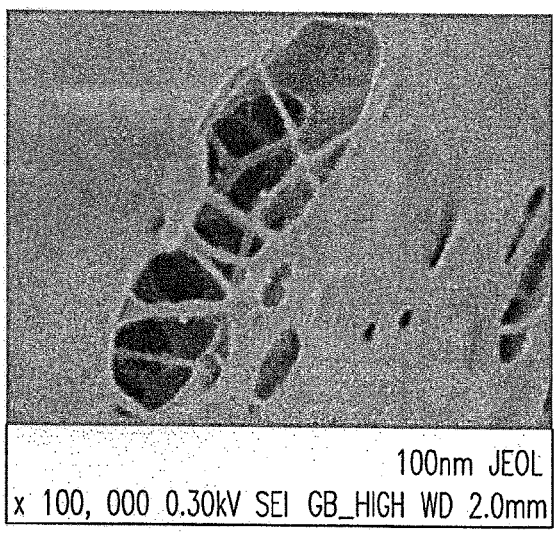
Figure 10A:
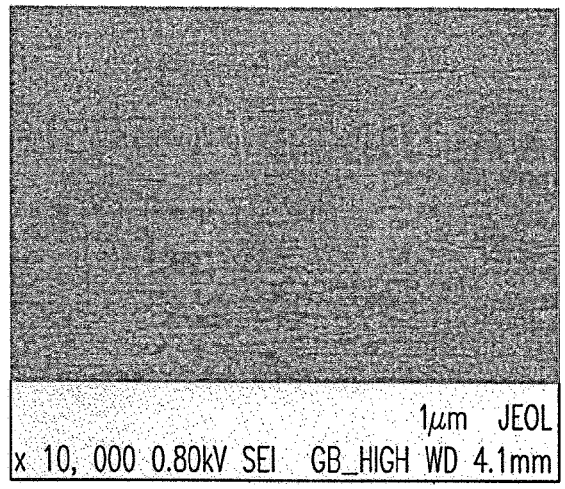
FIGS. 10A, 10B, and 10C are SEM micrographs of nanocomposite mixed-matrix membrane Sample 3-1 (PP/15.0% Ma-Si) at magnification levels of ×10,000, ×30,000, and ×50,000, respectively.
Figure 10B:
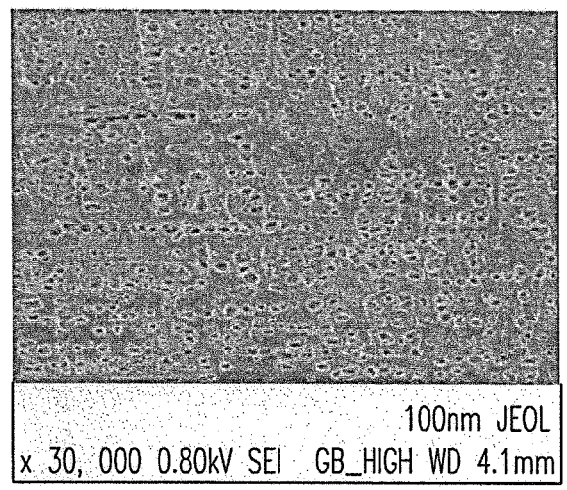
Figure 10C:
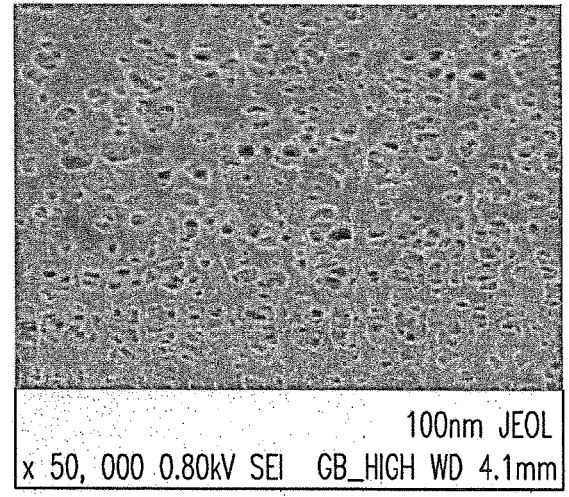
Figure 11A:
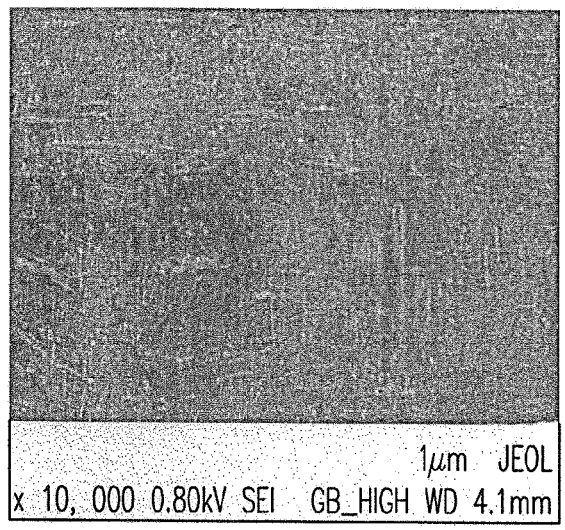
FIGS. 11A, 11B, and 11C are SEM micrographs of nanocomposite mixed-matrix membrane Sample 6-1 (PP/15.0% Ma-Si) at magnification levels of ×10,000, ×30,000, and ×50,000, respectively.
Figure 11B:
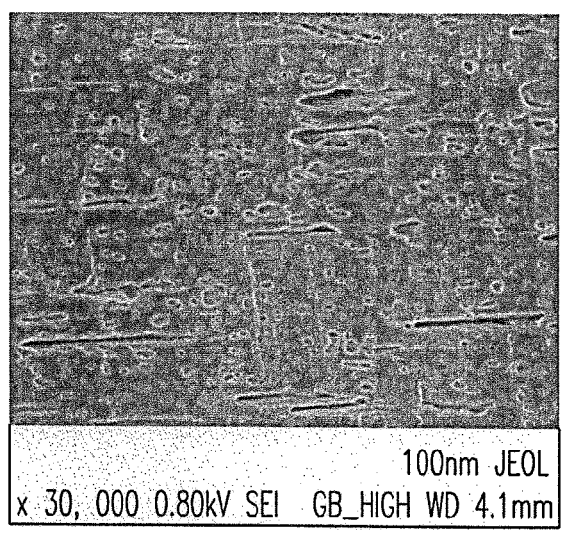
Figure 11C:
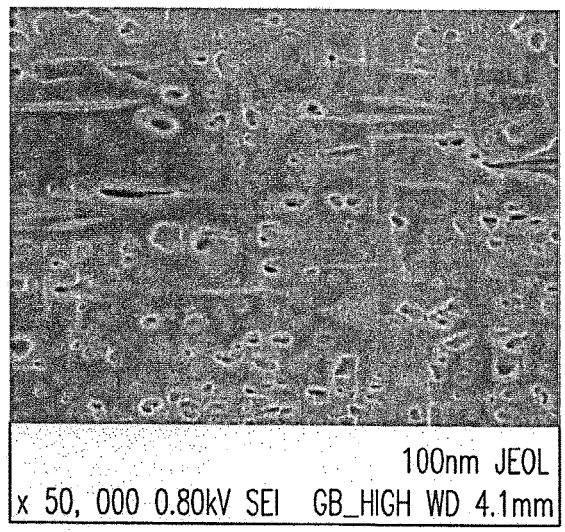

FIGS. 7A, 7B, and 7C are SEM images of sample 18, which is pure PP HF029 homopolymer with no nanomaterial additive. The SEM image shows very small slit-like voids, compared to the other samples, as can be seen in FIGS. 8A through 9C for 6% HNT-loaded and 15% HNT-loaded samples, and in FIGS. 10A through 11C for 6% Ma-Si-loaded and 15% Ma-Si-loaded samples. The intensity, size and size distribution of the slit-like formations differ from samples with low loadings of HNT and Ma-Si to samples with high loadings of HNT and Ma-Si. This is consistent with FIG. 5 and Table 7, in which the methanol flux increases as the HNT loading increases in the nanocomposite mixed-matrix samples. The same observations are also seen for Ma-Si-loaded samples, as can be seen in FIGS. 10A through 11C for the SEM images and FIG. 5 and Table 8 for the methanol flux.

The microporous nanocomposite mixed-matrix membranes tested were made from PP, which is a semi-crystalline polymer. Since these membranes are prepared via extrusion and post-extrusion stretching, they undergo orientation and annealing. During extrusion, the crystallites in semi-crystalline polymers, such as polypropylene (PP), are then aligned in the direction of orientation. During the post-extrusion stage, the amorphous regions between the crystallites are deformed, forming slit-like voids between the polymer crystallites, resulting in a porous structure. The absolute pore sizes and the pore size distribution of the prepared membranes are normally controlled by the rate of extension, extent of elongation, temperature at which the extension takes place, and most importantly, the percent loading and the type of the nanomaterial in the mixed-matrix of the nanocomposite.

The results of the SEM images show that the nanocomposite samples loaded with HNT form more slit-like voids than the samples loaded with Ma-Si, and hence the HNT-loaded samples give higher fluxes for methanol, as can be seen from Table 9. This might be attributed to the physical structure of the HNT and Ma-Si nanomaterials on the one hand, and on the post-extrusion processing conditions on the other. As was stated before, HNT nanomaterials are hollow tubes with length of 1000 nm to 5000 nm and internal diameter of 20 nm to 50 nm, while the Ma-Si nanofiller contains silicates in a platy layer form with outer diameter of 40 nm and an aspect ratio of 10:1. Therefore, upon extrusion and stretching, it is much easier for the HNT tubes to get aligned in the direction of extrusion flow and in the direction of stretching than the platy Ma-Si nanomaterial. This also explains the degree of post-extrusion stretching, where in the case of HNT-loaded nanocomposites, the hot stretching ranges between about 59% to about 231%, and for Ma-Si nanocomposites, the hot stretching ranges between about 31% to about 117%. This shows that in the case of HNT nanocomposite samples, the cold stretching and hot stretching were almost twice as much as that in the case of Ma-Si-loaded nanocomposite samples. Another factor affecting the flux of methanol is the tortuousity of the nanocomposite stretched samples. Because of the platy nature of the silicate, more tortuous path is expected in the case of Ma-Si loading than in the case of HNT loading. Hence, less flux of fluids and gases is expected in the case of Ma-Si-loaded nanocomposites. Table 9 confirms this conclusion, where the flux of methanol in HNT-loaded samples is significantly higher than the Ma-Si samples, especially for loadings exceeding 6% and at the same applied pressure of 145 psi.

TABLE 9

Post-extrusion conditions of SEM-analyzed nanocomposite mixed-matrix PP samples with different HNT and Ma-Si loading percentages

| Sample No. | HNT or Ma-Si (%) | Cold Stretch (%) | Hot Stretch (%)* | Hot Stretch Temp. (° C.) | Methanol Flux@145 psi (kg/m²/h) |
|---|---|---|---|---|---|
| 18 | 0.0 | 38.3 | 155.3 | 120 | 2.04 |
| 1C | 6.0-HNT | 15.0 | 127.0 | 140 | 51.67 |
| 1F | 15.0-HNT | 21.4 | 59.0 | 145 | 357.90 |
| 3-1 | 6.0-Ma-Si | 16.8 | 58.2 | 130 | 77.98 |
| 6-1 | 15.0-Ma-Si | 17.4 | 63.6 | 110 | 167.28 |

*Based on original length

Example 8

Pore Sizes and Pore Size Distribution and Methanol Flux of Mixed-Matrix Nanocomposite PP Samples with Different Percentages of HNT and Ma-Si Table 10 and FIGS. 12 to 17 show the wet flow and dry flow of gas, using nitrogen, according to standard test ASTM F-316, and the pore sizes and pore size distribution of some of the prepared microporous nanocomposite mixed-matrix samples made from polypropylene (PP) and HNT and Ma-Si nanomaterials with percentages of 0.0% nanofiller, 15% HNT and 6.0% Ma-Si respectively. Table 10 also shows the optimum post-extrusion processing conditions of the precursor thin films to give the corresponding optimum flux of methanol at an applied pressure of 145 psi using a high-pressure Sterlitech stirred cell (HP4750). Wet flow was conducted using a Porofil fluid with density of 1.85 gm/cm³, surface tension of 16.0 dyne/cm, contact angle of 0.0°, and pore tortuousity was assumed to be 1.0. The sample diameter was 25 mm and the measured sample area was 3.142 cm².

Figure 12:
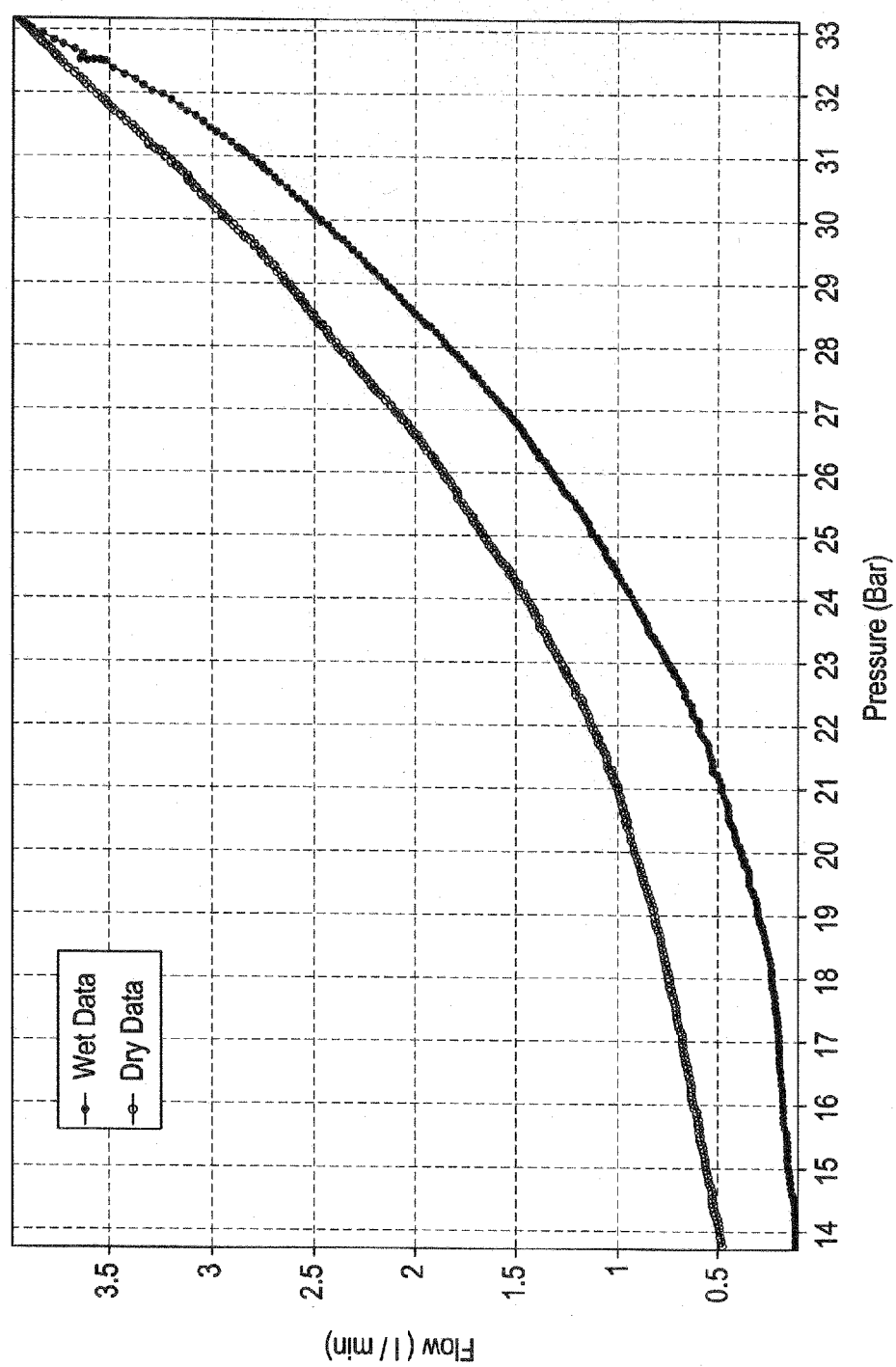
FIG. 12 is a graph comparing flow rate versus pressure for wet and dry PP (HF029) sample 18 with no nanomaterial loading.
Figure 13:
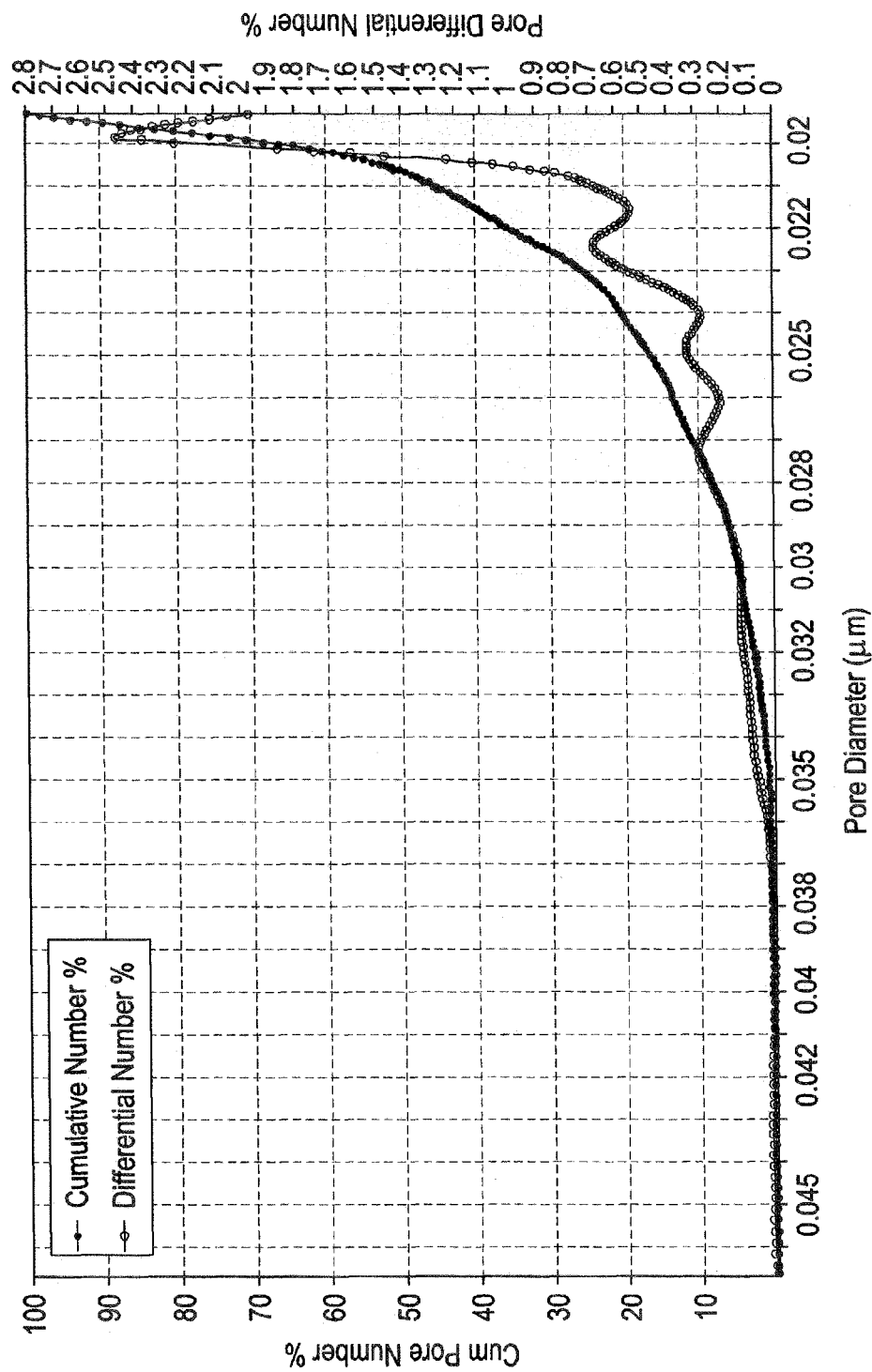
FIG. 13 is a graph showing cumulative pore number (%) versus pore diameter for PP (HF029) sample 18 with no nanomaterial loading.

Table 10 and FIG. 12 show the wet flow and dry flow of gas at various applied pressures to drive the wetting solution out of the pores for sample 18. Sample 18 is pure polypropylene HF029 with 0.0% nanomaterial loading with a flux of methanol of 6.8 kg/m²/h. at an applied nitrogen pressure of 145 psi. The cumulative pore number % (density) and pore differential number % versus pore diameter for this sample are shown in FIG. 13. The figure shows a narrow pore size distribution ranging from a minimum of 0.0197 μm to a maximum pore diameter of 0.0297 μm with an average pore diameter of 0.0297 μm.

Figure 14:
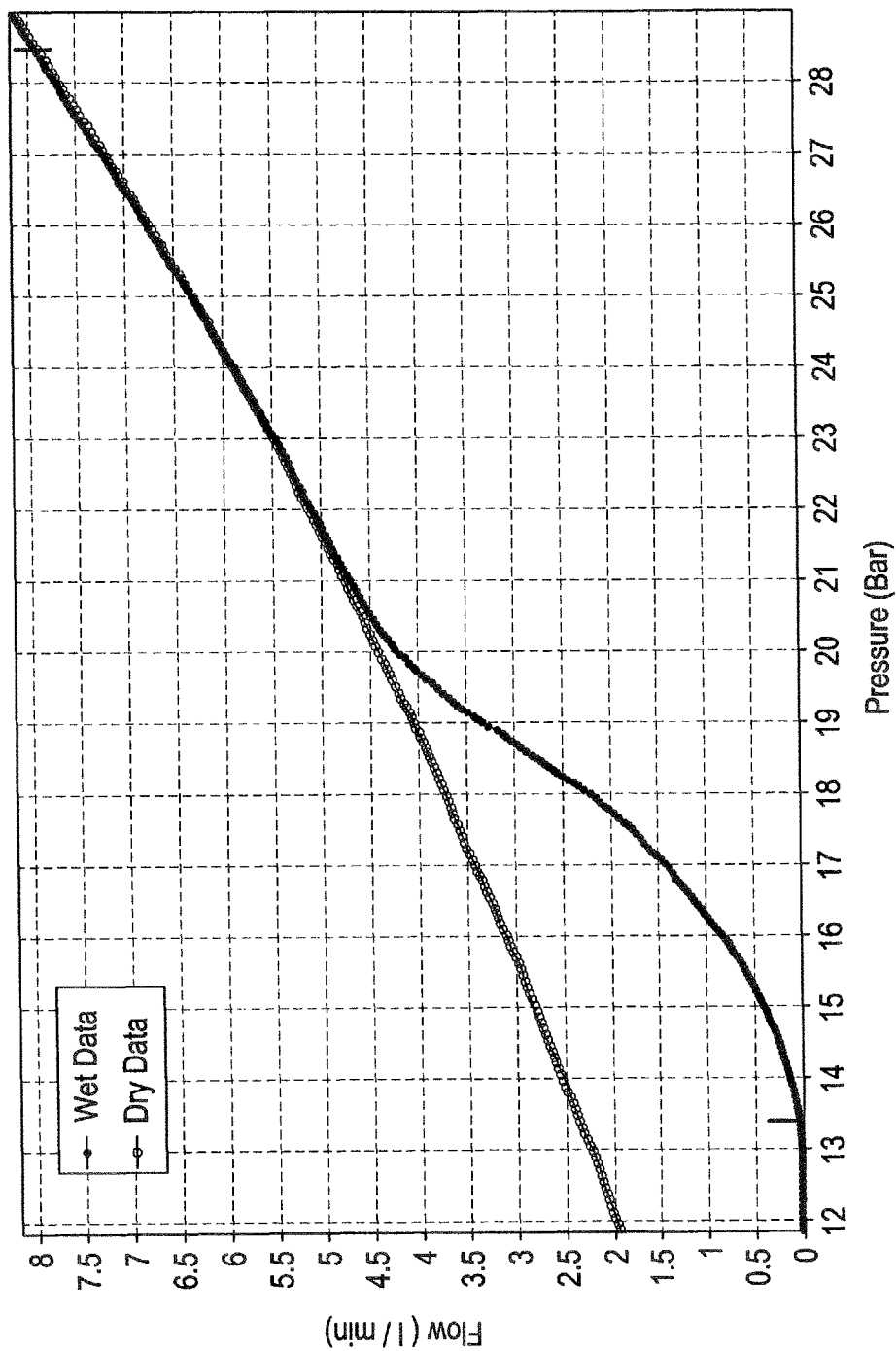
FIG. 14 is a graph comparing flow rate versus pressure for wet and dry nanocomposite PP (HF029) sample 1F with 15% HNT loading.
Figure 15:
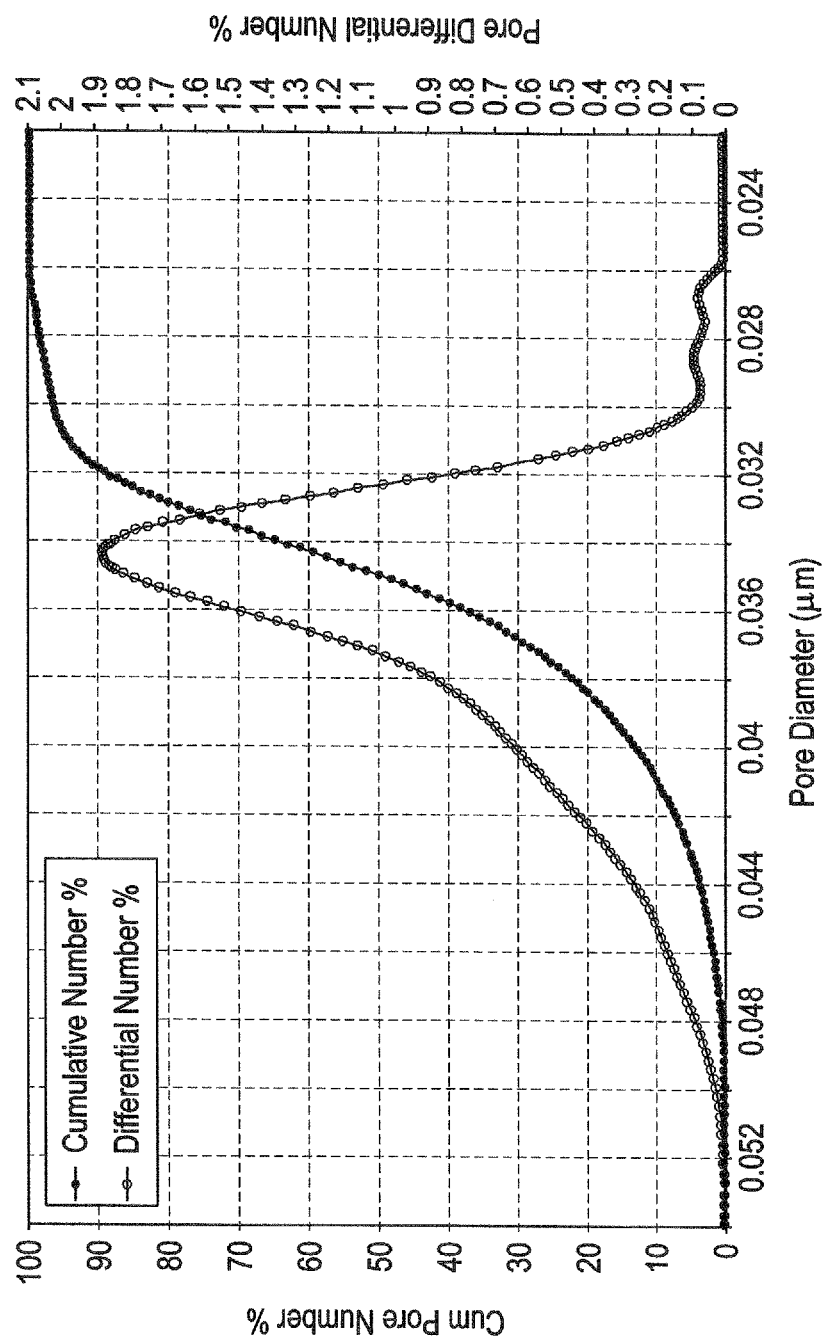
FIG. 15 is a graph showing the cumulative pore number (%) versus pore diameter for PP sample 1F with 15% HNT loading.

Table 10 and FIG. 14 also show the wet and dry flow of gas versus the applied pressure for sample 1F with 15% HNT loading with PP. This is the maximum loading of HNT of 15% with PP that gave a flux of methanol of about 719.58 kg/m²/h at an applied pressure of 145 psi. The data in Table 10 and FIG. 15 show that the minimum pore diameter is 0.0225 μm and the maximum pore diameter is 0.0477 μm, with the mean diameter of 0.0366 μm.

Figure 16:
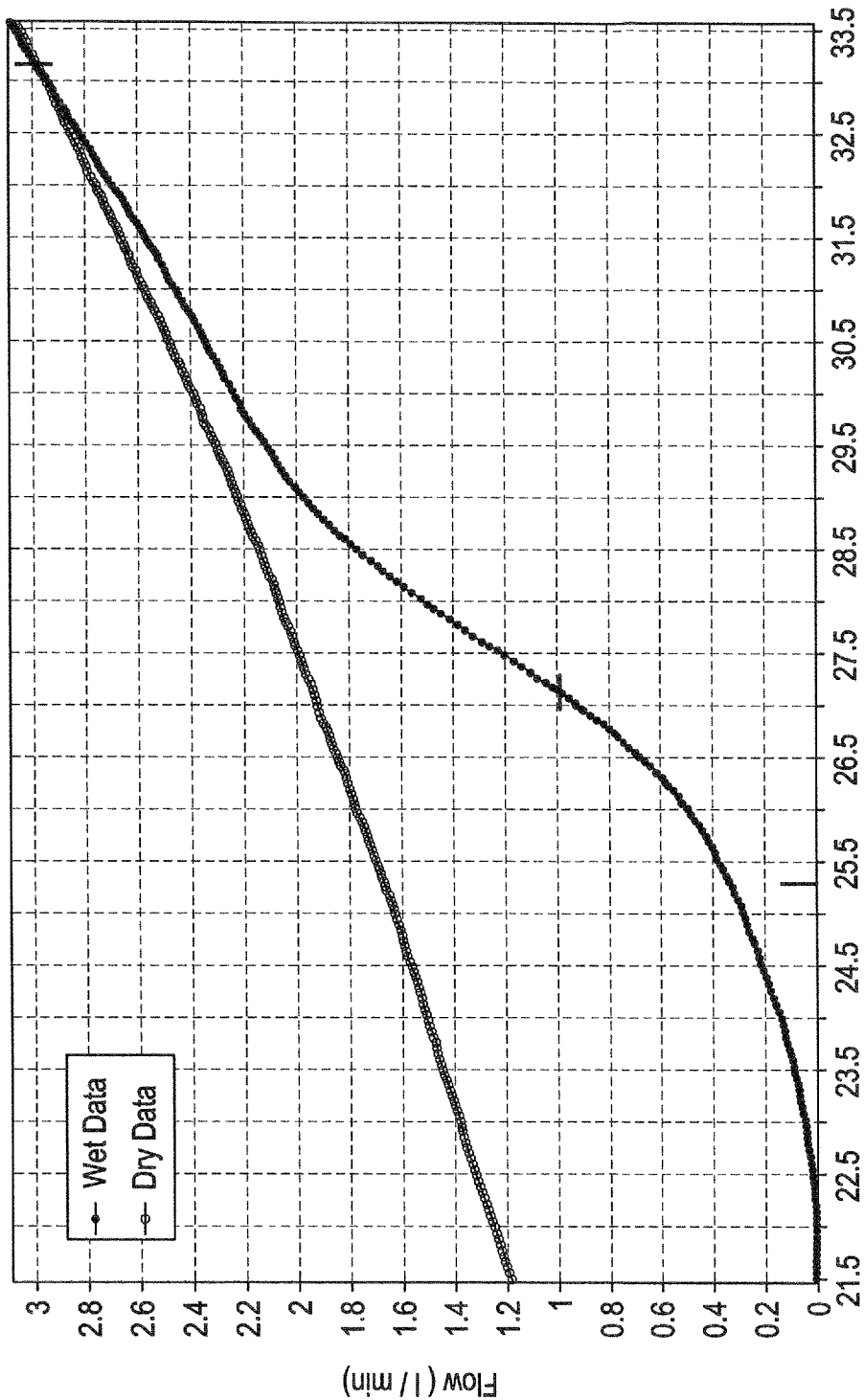
FIG. 16 is a graph showing flow rate as a function of Pressure for Wet and Dry Nanocomposite PP (HF029) sample 3-1 with 6% Ma-Si loading.
Figure 17:
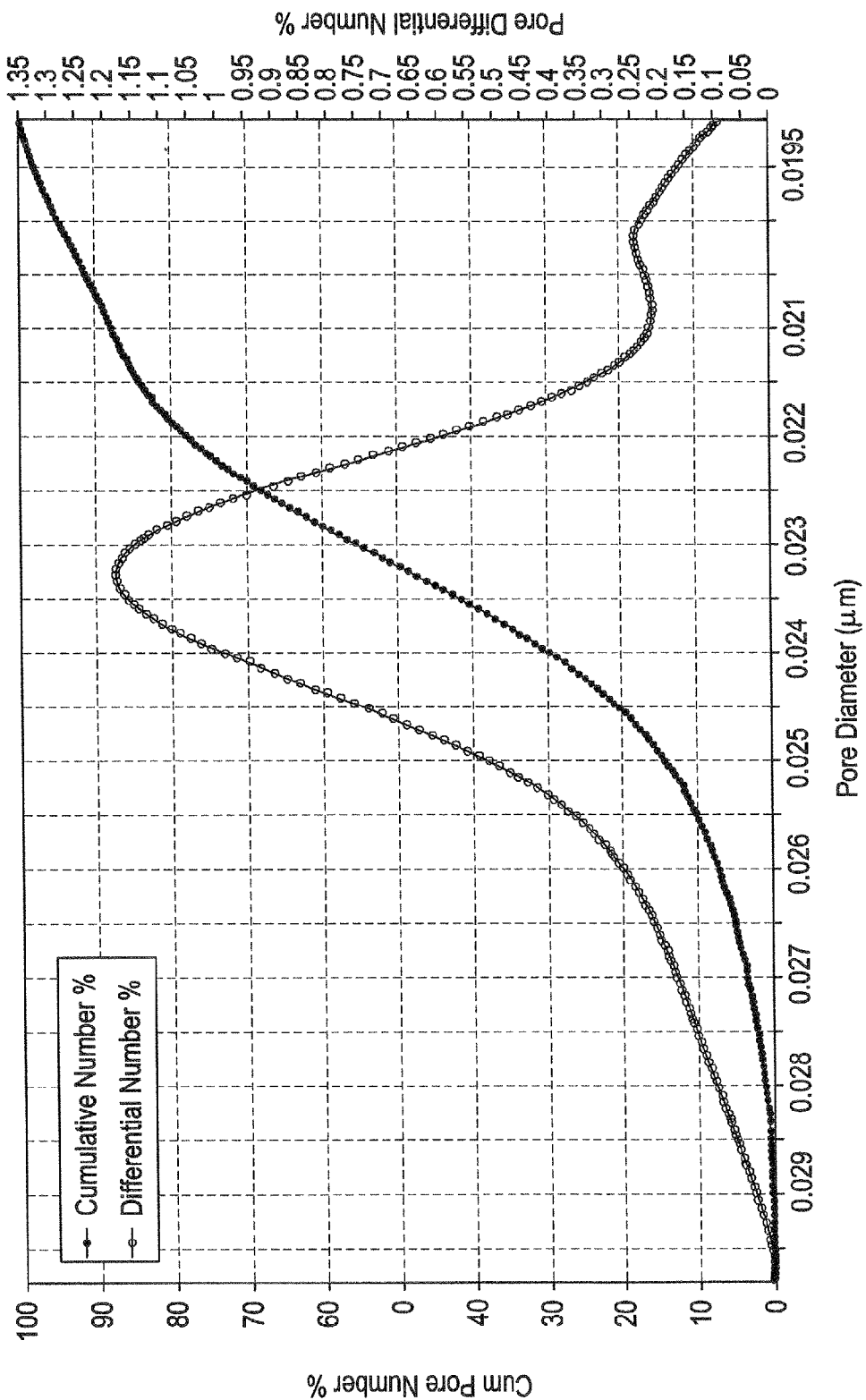
FIG. 17 is a graph showing cumulative pore number (%) versus pore diameter for Nanocomposite PP (HF029) sample 3-1 with 6% Ma-Si loading.

Table 10 and FIG. 16 show the wet and dry flow versus the applied pressure for sample 3-1 with 6.0% Ma-Si loading with PP. The flux of methanol is about 96.74 kg/m²/h at a pressure of 145 psi. FIG. 17 shows the cumulative and differential number % versus pore diameter, where the minimum pore diameter is 0.0193 μm and the maximum pore diameter is 0.0253 um, with the mean diameter of 0.0236 μm.

TABLE 10

Pore sizes and Methanol Flux of selected nanocomposite mixed-matrix samples

| Property | Sample No. 18 | Sample No. 1F | Sample No. 3-1 |
|---|---|---|---|
| Nanomaterial in Nanocomposite Film (%) | 0.0 | 15.0-HNT | 6.0 Ma-Si |
| Bubble Point Pressure (bar) | 21.531 | 13.41 | 25.28 |
| Bubble Point Flow Rate (l/min) | 0.5328 | 0.0352 | 0.3308 |
| Pore Size (μm) | | | |
| Max.: | 0.0297 | 0.0477 | 0.0253 |
| Mean: | 0.0217 | 0.0366 | 0.0236 |
| Min.: | 0.0197 | 0.0225 | 0.0193 |
| Post-Extrusion Stretching: | | | |
| Cold Stretch (%) | 38.5 | 24.0 | 14.0 |
| Hot Stretch at 120° C.: | 181.7* 290.2** | 51.60* 88.0** | 37.5* 56.8** |
| Methanol Flux at 145 psi (kg/m²/h) | 6.80 | 719.58 | 96.74 |

*Based on cold- stretched length, **Based on original length.

Example 9

Effect of Nanomaterials on the Melt Flow Index (MFI) of PP/Nanomaterial Blends Loaded with Different Percentages of HNT and Ma-Si Table 11 shows the effect of nanomaterial percent loading on the flow behavior of the PP/nanomaterial blends using a Melt Flow Index (MFI) apparatus. MFI is a test method used according to standard (ASTM D-1238 and ISO 1133) to measure the amount of molten polymer flowing in 10 minutes at 230° C. Table 11 shows that as the percent loading of HNT increases from 0.0% to 15%, the MFI of the blend increases by more than a factor of two, or it increases from 4.82 g/10 min to about 9.85 g/10 min. Table 11 also shows a similar trend for Ma-Si nanofiller, where the MFI for the blends increases also by a factor of two or it increases from 4.82 g/10 min for 0.0% Ma-Si loading to 9.16 g/10 min for 15% Ma-Si loading. The data shows that the flow in case of HNT-loaded blends is more than that in case of Ma-Si-loaded blends, and this might be due to the physical structure of the HNT, as was pointed out earlier.

TABLE 11

Melt Flow Index (MFI) of PP/nanomaterial blends

| HNT % or Ma-Si % in blend | Melt Flow Index at 230° C. for HNT-loaded blends (g/10 min) | Melt Flow Index at 230° C. for Ma-Si-loaded blends (g/10 min) |
| --- | --- | --- |
| 0.0 | 4.82 | 4.82 |
| 0.9 | 5.61 | 5.95 |
| 3.0 | 8.25 | 6.69 |
| 6.0 | 9.95 | 6.91 |
| 9.9 | 10.21 | 7.25 |
| 12.0 | 10.96 | 8.25 |
| 15.0 | 9.85 | 9.16 |

Example 10

Effect of Nanomaterial Loading and Accelerated Weathering (AW) on the Physical Properties of the Nanocomposite PP Samples with Different Percentages of HNT and Ma-Si Accelerated Weathering (AW) was conducted to measure the effect of aging on the physical properties of the nanocomposite samples loaded with different percentages of HNT and Ma-Si. The physical properties include the yellow index (Yi), the whiteness index (Wi), opacity, and transparency of the prepared nanocomposite samples. AW was conducted according to ASTM D-4329 standard, using a QUV machine manufactured by Q-Panel Lab Products. Samples were exposed to the exposure cycle of the QUV machine of 4 hours of UV/40° C./4 hours of condensation, followed by 4 hours of UV/60° C./4 hours of condensation. The colorimeter (Spectrophotometer NF 33 Model, Nippon Co. Ltd.) was used to measure the difference in color of the various polymeric blends according to standard ASTM-D 2244. A set of parameters is measured to calculate the total change in the color of the exposed film or sheet.

The effect of nanomaterial loading on the physical properties of the nanocomposites is quite significant before and after aging. The yellow index (Yi) of the nanomaterial/polypropylene mixed-matrix nanocomposites increased quite significantly, to about eleven times for 15% Ma-Si loading compared to 0.0% Ma-Si, loading while the whiteness index (Wi) decreased quite modestly of about 21.5% for the same samples before aging. Also the yellow index (Yi) increases quite significantly for about nine times for 15% HNT loading, compared to 0.0% HNT™ loading, while the whiteness index (Wi) decreased quite modestly, for about 14.9% for 15% HNT loading.

The effect of Accelerated Weathering aging on the Yi and Wi is also significant, where the Yi increased by a factor of 3, while the whiteness index (Wi) decreased modestly by about 11.6% for samples loaded with 0.0% HNT and after 67 hours of AW. For samples with 15% HNT loading, the Yi did not change significantly upon AW, while the Wi decreased by about 12.0% after 67 hours of AW aging. As for the effect of AW on opacity and transparency, a slight increase in opacity of 14.7% and a slight decrease in transparency of 1.1% took place when the loading of Ma-Si increased from 0.0% to 15%, and opacity increases from 4.3% for 0.0% loading to 9.1% for 15% Ma-Si loading after 67 hours of AW exposure. Also, opacity increased by almost 17.5% when % HNT increased from 0.0% to 15%, and opacity increased by about 10% when they were exposed to about 67 hours of AW aging. Transparency decreased by 1.4% for samples loaded with 15% HNT, compared to 0.0% HNT before AW aging, and remained almost unchanged when they were aged for 67 hours of AW.

While the examples given above have been limited to polypropylene (PP) polymer as the main carrier and as representative to various hydrophobic polymers, it is obvious that other hydrophobic polymers, such as polyvinylidene fluoride (PVDF), polytrifluoroethylene (PTFE), and other perfluoro polymers can also be used with the nanomaterials mentioned in the examples, namely; Halloysite nanotubes (HNT) and PP-grafted maleic anhydride nano-layered silica. Also, other polymers can be used in combination with polypropylene, such as polyethylene, polystyrene and others. However, polypropylene was selected because of its lower cost, lower density, good transparency, good mechanical properties, good thermal properties, and easy processing.

The mixed-matrix nanocomposite films are hydrophobic, and upon post-extrusion processing, have high porosity, good mechanical properties, good physical properties, good chemical resistance, and good thermal stability, including very good permeability, with a high vapor flux and high flux for other solutions, such as methanol. These qualities make these microporous mixed-matrix nanocomposite films excellent for Membrane Distillation and for other applications, such as liquid and gas separations. These types of membranes could be used for water desalination, water treatment and other industrial applications.

The new microporous nanocomposite mixed-matrix membrane can be used in membrane distillation processes as a Membrane Distillation (MD) membrane for seawater and brackish water desalination in single form, or in an integrated form with other membrane systems, such as Reverse Osmosis (RO), Membrane Crystallizer (MCr), Nanofiltration (NF) and others, wherein the integrated membrane technologies systems could provide a more cost-effective, environmentally friendly acceptable process and be able to solve some existing key water desalination problems. They can also be used for desalination of high saline water, such as water co-produced with oil from oil wells that could have a salt concentration approaching 25% for zero liquid discharge (ZLD). In addition, these microporous mixed-matrix nanocomposite films are good membranes for other industries, such as waste water treatment, concentration of fruit juices, separation of liquids and separation of gases in petrochemicals and in batteries, such as lithium batteries, fuel cells, the dairy industry and other industries.

It is to be understood that the present invention is not limited to the embodiments described above, but encompasses any and all embodiments within the scope of the following claims.

I claim:

1. A nanocomposite mixed-matrix microporous membrane, consisting of:
    a nanofiller, the nanofiller consisting of Halloysite nanotubes (HNT), wherein Halloysite nanotubes have a percentage loading in the membrane of 15% by weight of the nanocomposite; and
    a hydrophobic polymer, wherein the hydrophobic polymer consists of polypropylene, the nanofiller being dispersed in the hydrophobic polymer to form the nanocomposite, the nanocomposite being extruded and stretched during extrusion, the nanocomposite being annealed and subject to both cold stretching and hot stretching after extrusion to form the microporous membrane having micron-size pores, wherein the pores are configured as elongated slits.

2. The nanocomposite mixed-matrix membrane according to claim 1, wherein said Halloysite nanotubes comprise a 1:1 layered alumino-silicate clay having a chemical formula of Al2O3 Si2O4 4(H2O)) formed as multi-layered hollow cylinders having walls of alternating layers of alumina and silica.

3. The nanocomposite mixed-matrix membrane according to claim 2, wherein the cylinders of said Halloysite nanotubes have an outer diameter between 40 nm and 300 nm, an inner diameter between 16 nm and 50 nm, and a longitudinal length between 1000 nm and 5000 nm.

\* \* \* \* \*